United States Patent
Merino

(10) Patent No.: US 9,686,021 B2
(45) Date of Patent: Jun. 20, 2017

(54) WIRELESS NETWORK DISCOVERY AND PATH OPTIMIZATION ALGORITHM AND SYSTEM

(75) Inventor: Carlos Merino, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1166 days.

(21) Appl. No.: 13/075,582

(22) Filed: Mar. 30, 2011

(65) Prior Publication Data

US 2012/0249338 A1 Oct. 4, 2012

(51) Int. Cl.
*G08C 19/00* (2006.01)
*E21B 47/16* (2006.01)
(Continued)

(52) U.S. Cl.
CPC ............ *H04B 11/00* (2013.01); *E21B 47/122* (2013.01); *E21B 47/16* (2013.01); *H04W 40/12* (2013.01); *H04W 84/18* (2013.01)

(58) Field of Classification Search
CPC ....... E21B 47/122; E21B 47/16; H04B 11/00; H04W 40/12; H04W 84/18
(Continued)

(56) References Cited

U.S. PATENT DOCUMENTS 5,148,408 A 9/1992 Matthews
5,293,937 A 3/1994 Schultz et al.
(Continued)

FOREIGN PATENT DOCUMENTS

EP 1882811 B1 1/2008
EP 1887181 B1 2/2008
(Continued)

OTHER PUBLICATIONS

E.M. Sozer et al, "Underwater Acoustic Networks", IEEE Journal of Oceanic Engineering, XP011042512, Jan. 1, 2000, pp. 72-83.
(Continued)

*Primary Examiner* — Sisay Yacob
(74) *Attorney, Agent, or Firm* — Cameron R. Sneddon; Diana Sangalli

(57) ABSTRACT

A wireless modem for communication in a network of wireless modems via a communication channel includes a transceiver assembly, transceiver electronics and a power supply. The transceiver electronics include transmitter electronics, receiver electronics and at least one processing unit. The transmitter electronics cause the transceiver assembly to send wireless signals into the communication channel. The receiver electronics decode signals received by the transceiver assembly. The at least one processing unit executes instructions to (1) enable the transmitter electronics to transmit the wireless signals into the communication channel to at least two wireless modems in a first direction away from the transceiver assembly, (2) receive a signal from at least one of the wireless modems, (3) assign a quality parameter to the signals received from the other wireless modems, and (4) select one of the wireless modems to communicate with based on an examination of the quality parameters with at least one predetermined criterion. The power supply supplies power to the transceiver assembly and the transceiver electronics.

19 Claims, 9 Drawing Sheets

(51) Int. Cl.
*H04B 11/00* (2006.01)
*H04W 40/12* (2009.01)
*E21B 47/12* (2012.01)
*H04W 84/18* (2009.01)

(58) Field of Classification Search
USPC ..... 340/853.1, 854.3, 854.6, 870.11; 367/81, 367/82
See application file for complete search history.

(56) References Cited

U.S. PATENT DOCUMENTS

| | | | |
|---|---|---|---|
| 5,469,736 A | 11/1995 | Moake | |
| 5,796,677 A | 8/1998 | Kostek et al. | |
| 5,850,369 A | 12/1998 | Rorden et al. | |
| 5,852,587 A | 12/1998 | Kostek et al. | |
| 5,886,303 A | 3/1999 | Rodney | |
| 5,995,449 A | 11/1999 | Green et al. | |
| 6,084,826 A | 7/2000 | Leggett, III | |
| 6,137,747 A | 10/2000 | Shah et al. | |
| 6,310,829 B1 | 10/2001 | Green et al. | |
| 6,434,084 B1 | 8/2002 | Schultz | |
| 6,466,513 B1 | 10/2002 | Pabon et al. | |
| 6,847,585 B2 | 1/2005 | Macpherson | |
| 6,899,178 B2 | 5/2005 | Tubel | |
| 7,139,218 B2 | 11/2006 | Hall et al. | |
| 7,207,396 B2* | 4/2007 | Hall et al. | 175/40 |
| 7,265,682 B2 | 9/2007 | Memarzadeh et al. | |
| 7,324,010 B2 | 1/2008 | Gardner et al. | |
| 7,339,494 B2 | 3/2008 | Shah et al. | |
| 7,397,388 B2 | 7/2008 | Huang et al. | |
| 7,460,435 B2 | 12/2008 | Garcia-Osuna et al. | |
| 8,162,055 B2 | 4/2012 | Lewis et al. | |
| 8,172,007 B2 | 5/2012 | Dolman et al. | |
| 2002/0195247 A1 | 12/2002 | Ciglenec et al. | |
| 2003/0098799 A1 | 5/2003 | Zimmerman | |
| 2005/0011645 A1 | 1/2005 | Aronstam et al. | |
| 2005/0022402 A1 | 2/2005 | Ash et al. | |
| 2005/0035874 A1 | 2/2005 | Hall et al. | |
| 2005/0284663 A1* | 12/2005 | Hall et al. | 175/48 |
| 2006/0114746 A1 | 6/2006 | Gardner et al. | |
| 2006/0219438 A1 | 10/2006 | Moore et al. | |
| 2008/0231467 A1 | 9/2008 | Jeffryes | |
| 2008/0236814 A1 | 10/2008 | Roddy | |
| 2008/0242332 A1* | 10/2008 | Suh | H04B 7/0452 455/517 |
| 2008/0253228 A1 | 10/2008 | Camwell et al. | |
| 2009/0190484 A1 | 7/2009 | Johnson et al. | |
| 2009/0192731 A1 | 7/2009 | De Jesus et al. | |
| 2010/0051275 A1 | 3/2010 | Lewis et al. | |
| 2010/0286916 A1 | 11/2010 | Wang | |
| 2011/0205080 A1* | 8/2011 | Millot et al. | 340/854.4 |

FOREIGN PATENT DOCUMENTS

| | | |
|---|---|---|
| EP | 1950586 A2 | 7/2008 |
| EP | 2157279 A1 | 2/2010 |
| WO | 00/29717 A2 | 5/2000 |
| WO | 2010/069633 A1 | 6/2010 |
| WO | WO 2010069623 A1 * | 6/2010 |

OTHER PUBLICATIONS

International Search Report for the equivalent PCT patent application No. PCT/IB2012/051494 issued on Jun. 29, 2012.
Examination Report for the equivalent Australian patent applicaiton No. 2012235719 issued on Oct. 1, 2014.
Office action issued in the related MY application PI2013701779, dated Nov. 15, 2016 (5 pages).
Examination Report issued in the related CA application 2785697, dated Oct. 18, 2016 (4 pages).
Office action issued in the related MX application MX/a/2012/007646, dated May 22, 2014 (7 pages).
Office action issued in the related MX application MX/a/2012/007646, dated Oct. 29, 2014 (7 pages).
International Search Report and Written Opinion issued in the related PCT application PCT/EP2010/007727, dated May 31, 2012 (9 pages).
International Preliminary Report on Patentability issued in the related PCT application PCT/EP2010/007727, dated Jul. 4, 2012 (7 pages).
Examination report issued in the related AU application 2012235719, dated Jul. 28, 2015 (3 pages).
International Preliminary Report on Patentability issued in the related PCT application PCT/EP2012/051494 dated Oct. 1, 2013 (8 pages).

* cited by examiner

|  | PAIR 1 | PAIR 2 | PAIR 3 | PAIR 4 | PAIR 5 | PAIR 6 |
|---|---|---|---|---|---|---|
| | BIT RATE HIGH | | | BIT RATE LOW | | |
| Mi+1 | QP=18 | NR | QP=21 | QP=25 | QP=23 | NR |
| Mi+2 | QP=15 | NR | QP=17 | QP=15 | NR | NR |

NR= NO RESPONSE

FIG. 7

| PAIR FOR Mi → Mi+1 | PAIR FOR Mi → Mi+2 | PAIR FOR Mi+1 → Mi+2 | PAIR FOR Mi+1 → Mi+3 | PAIR FOR Mi+2 → Mi+3 | PAIR FOR Mi+2 → Mi+4 | PAIR FOR Mi+3 → Mi+4 | ... |

FIG. 8

WIRELESS NETWORK DISCOVERY AND PATH OPTIMIZATION ALGORITHM AND SYSTEM

CROSS-REFERENCE TO RELATED APPLICATIONS

Not Applicable.

TECHNICAL FIELD

This invention relates, in general, to wireless telemetry systems for use with installations in oil and gas wells or the like. More particularly, the present invention relates to a method and system for a wireless modem to determine a path communication with other wireless modems for transmitting and receiving data and control signals between a location down a borehole and the surface, or between wireless modems (i.e., a first wireless modem, a second wireless modem, etc.) at various downhole locations.

BACKGROUND

One of the more difficult problems associated with any borehole is to communicate measured data between one or more locations down a borehole and the surface, or between downhole locations themselves. For example, in the oil and gas industry it is desirable to communicate data generated downhole to the surface during operations such as drilling, perforating, fracturing, and drill stem or well testing; and during production operations such as reservoir evaluation testing, pressure and temperature monitoring. Communication is also desired to transmit intelligence from the surface to downhole tools, equipment, or instruments to effect, control or modify operations or parameters.

Accurate and reliable downhole communication is particularly important when complex data comprising a set of measurements or instructions is to be communicated, i.e., when more than a single measurement or a simple trigger signal has to be communicated. For the transmission of complex data it is often desirable to communicate encoded digital signals.

One approach which has been widely considered for borehole communication is to use a direct wire connection between the surface and the downhole location(s). Communication then can be made via electrical signal through the wire. While much effort has been spent on "wireline" communication, its inherent high telemetry rate is not always needed and its energy requirements cannot always be feasibly met.

Wireless communication systems have also been developed for purposes of communicating data between a downhole tool and the surface of the well. These techniques include, for example, communicating commands downhole via (1) electromagnetic waves; (2) pressure or fluid pulses; and (3) acoustic communication. Conventional sonic sources and sensors used in downhole tools are described in U.S. Pat. Nos. 6,466,513, 5,852,587, 5,886,303, 5,796,677, 5,469,736, 6,084,826, 6,466,513, 7,339,494, and 7,460,435.

It is useful for the wireless modems to know various data regarding the other wireless modems so that such wireless modems can efficiently communicate. For example, knowledge of the nearest neighbor in a testing pipe string is useful to be energy efficient and to find the shortest path between the surface and the downhole tools, with less hops. In fact, the network stabilization is quicker and easier. In the past, wireless modems have been programmed or otherwise adapted to communicate with a known neighboring wireless modem before such wireless modems are installed on a testing pipe string. However, a potentially major problem can arise where a network of wireless modems are programmed to communicate with a known neighboring wireless modem, and where the field engineers assemble the tool string with the network of wireless modems in an improper order/arrangement. In such situation, a communication signal could be lost between hops, preventing data and control signals from transmitting between the surface and a location downhole. As such, there is a need for a new and improved method for finding the identity, position or relative order of wireless modems within a network of wireless modems coupled to a communication channel such as a testing/drill/tubing string. With such a network discovery algorithm, a field engineer does not have to rely on a perfect order of placement for each wireless modem so that the wireless modems will know the identity of their nearest neighbors and thereby ensure a reliable network of communication.

In network industries operating above the surface of the Earth, flooding algorithms are used to discover the neighboring wireless modems. Flood algorithms work very well, however, it is known that they require many exchanges of messages making flood algorithms impractical in a downhole environment where power consumption is important and data rates are much slower.

Algorithms for determining a bit rate and/or a frequency for acoustic communication between two wireless modems have been proposed. See for example WO 2010/069633.

However, despite the efforts of the prior art, there exists a need for a wireless modem that can determine a path for communication between two or more wireless modems in a network communication system in a manner that is suitable for use in a downhole environment.

DISCLOSURE OF THE INVENTION

In one aspect, the present disclosure describes a wireless modem for communication in a network of wireless modems via a communication channel includes a transceiver assembly, transceiver electronics and a power supply. The transceiver electronics include transmitter electronics, receiver electronics and at least one processing unit. The transmitter electronics cause the transceiver assembly to send wireless signals such as acoustic signals into the communication channel. The communication channel can be a drill string, testing string, production tubing, tubular casing, or the like. The receiver electronics decode signals received by the transceiver assembly. The at least one processing unit executes instructions to (1) enable the transmitter electronics to transmit the wireless signals into the communication channel to at least two wireless modems in a first direction away from the transceiver assembly, (2) receive a signal from at least one of the wireless modems, (3) assign a quality parameter to the signals received from the other wireless modems, and (4) select one of the wireless modems to communicate with based on an examination of the quality parameters with at least one predetermined criterion. The power supply supplies power to the transceiver assembly and the transceiver electronics.

The wireless signals sent into the communication channel may comprise a variable signal frequency and a variable signal bitrate cooperating to define a transmission pair for the wireless signals.

In another aspect, the at least one processing unit executes instructions to further (5) enable the transmitter and receiver electronics to subsequently communicates with the selected wireless modem.

The selected wireless modem can be characterized as at least a two hop modem, such as a three hop modem or a four hop modem.

In yet a further aspect, the at least one processing unit can enable the transmitter electronics and the receiver electronics to communicate with the selected wireless modem on a transmission pair based on the quality parameter assigned to the signal received from the selected wireless modem.

In another aspect, one of the wireless modems can be a first wireless modem, and another one of the wireless modems can be a second wireless modem, and wherein the at least one processing unit executes instructions to enable the receiver electronics to receive the signal from the first wireless modem on a first predetermined time slot and to receive the signal from the second wireless modem on a second predetermined time slot such that the signals are received at different times.

In yet another aspect, one of the wireless modems is a first wireless modem, and another one of the wireless modems is a second wireless modem, and wherein the at least one processing unit executes instructions to enable the receiver electronics to receive the signals from the first and second wireless modems on variable time slots.

In another aspect, the present disclosure describes a method for determining a path to communicate using wireless modems in a downhole environment, comprising the steps of: coupling a plurality of wireless modems to an elongated member extending from within a borehole to a surface location; and enabling a first wireless modem to transmit a series of signals having different transmission characteristics to at least two other wireless modems in a first direction from the first wireless modem via the elongated member, to receive a series of signals from other wireless modems on at least one of the different transmission characteristics, to assign a quality parameter to the signals received from the other wireless modems having different transmission characteristics, and to determine which of the other wireless modems to communicate with based on an examination of the quality parameters assigned to the received signals from the other wireless modems with at least one predetermined criterion. The elongated member can be a drill string, and the signals can be acoustic signals.

In yet another aspect, the present disclosure describes a method for making a wireless modem, comprising the steps of: connecting a transceiver assembly to transceiver electronics having transmitter electronics, receiver electronics and at least one processing unit suitable for causing the transceiver assembly to transmit and receive wireless signals; and storing a path optimization algorithm on one or more non-transitory machine readable medium accessible by the at least one processing unit of the transceiver electronics with the path optimization algorithm having instructions that when executed by the at least one processing unit cause the at least one processing unit to (1) enable the transmitter electronics to transmit a wireless signal into a communication channel to at least two modems in a first direction away from the transceiver assembly, (2) receive a signal from at least one of the wireless modems, (3) assign a quality parameter to the signals received from the other wireless modems, and (4) select one of the wireless modems to communicate with based on an examination of the quality parameters with at least one predetermined criterion.

These together with other aspects, features, and advantages of the present invention, along with the various features of novelty, which characterize the invention, are pointed out with particularity in the claims annexed to and forming a part of this disclosure. The above aspects and advantages are neither exhaustive nor individually or jointly critical to the spirit or practice of the invention. Other aspects, features, and advantages of the invention will become readily apparent to those skilled in the art from the following detailed description in combination with the accompanying drawings, illustrating, by way of example, the principles of the invention. Accordingly, the drawings and description are to be regarded as illustrative in nature, and not restrictive.

BRIEF DESCRIPTION OF THE SEVERAL VIEWS OF THE DRAWINGS

Implementations of the invention may be better understood when consideration is given to the following detailed description thereof. Such description makes reference to the annexed pictorial illustrations, schematics, graphs, drawings, and appendices. In the drawings:

FIG. 7 is a trace-route table showing the sequence of communication between the wireless modems in the downhole environment in accordance with the method shown in FIG. 6;

FIG. 8 is a table showing the results of the received signals using the method shown in FIG. 6;

DETAILED DESCRIPTION

Numerous applications of the present invention are described, and in the following description, numerous specific details are set forth. However, it is understood that implementations of the invention may be practiced without these specific details. Furthermore, while particularly described with reference to transmitting data between a location downhole and the surface during testing installations, aspects of the invention are not so limited. For example, some implementations of the invention are applicable to transmission of data from the surface during drilling, in particular measurements while drilling (MWD). Additionally, some aspects of the invention are applicable throughout the life of a wellbore including, but not limited to, during drilling, logging, drill stem testing, fracturing, stimulation, completion, cementing, and production.

Figure 1:
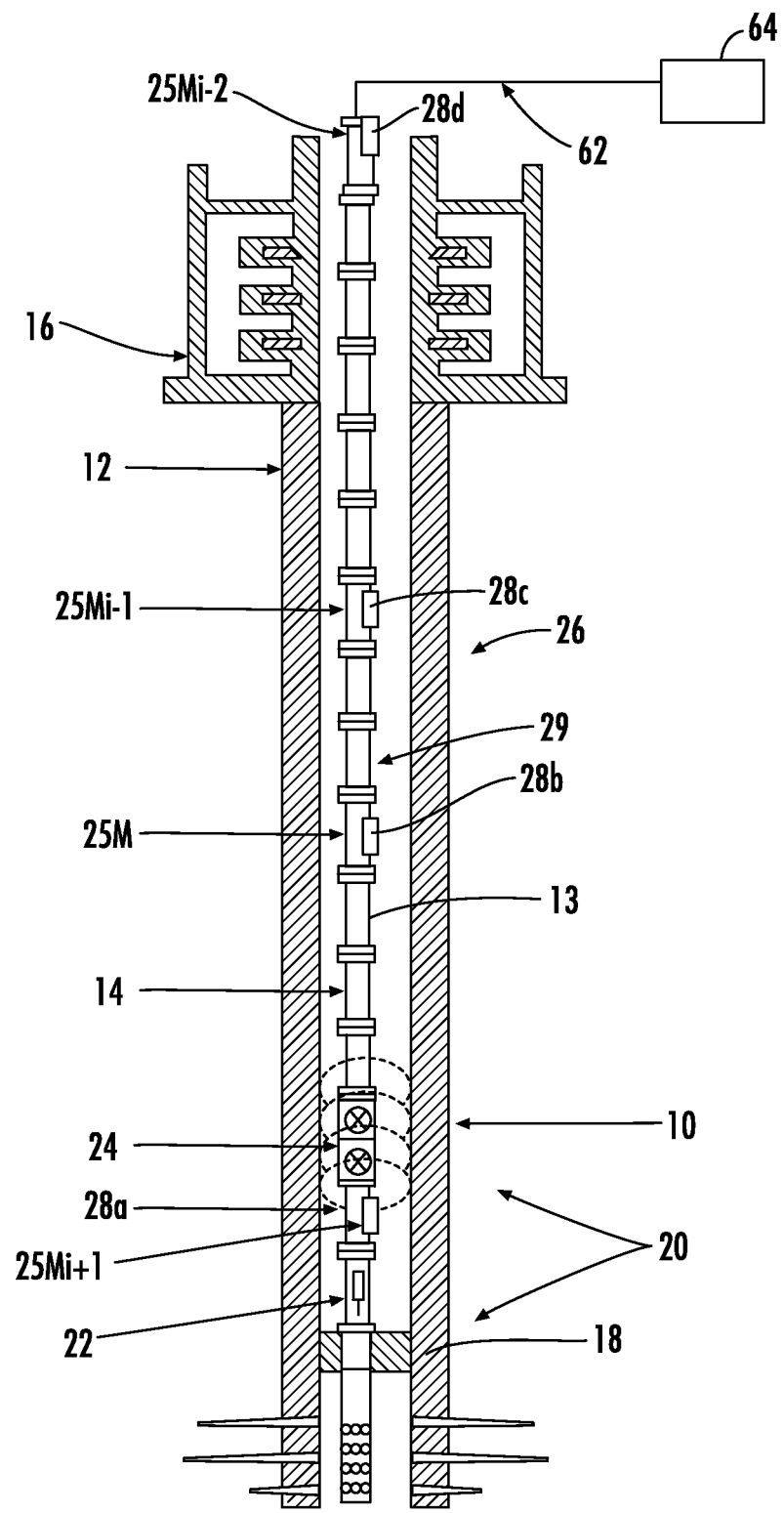
FIG. 1 shows a schematic view of a wireless telemetry system for use with the present invention.

In particular, however, the present invention is applicable to testing installations such as are used in oil and gas wells or the like. FIG. 1 shows a schematic view of such an installation. Once the well has been drilled, the drilling apparatus is removed from the well and tests can be performed to determine the properties of the formation through which the well has been drilled. In the example of FIG. 1, the well 10 has been drilled, and lined with a steel casing 12 (cased hole) in the conventional manner, although similar systems can be used in unlined (open hole) environments. In order to test the formations, it is necessary to place testing apparatus in the well close to the regions to be tested, to be able to isolate sections or intervals of the well, and to convey fluids from the regions of interest to the surface. This is commonly done using an elastic media 13, such as a drill pipe 14, such as a jointed tubular drill pipe, which extends from the well-head equipment 16 at the surface (or sea bed in subsea environments) down inside the well 10 to a zone of interest. Although the elastic media 13 will be described herein with respect to the drill pipe 14, it should be understood that the elastic media 13 can take other forms in accordance with the present invention, such as production tubing, a drill string, a tubular casing, or the like. The well-head equipment 16 can include blow-out preventers and connections for fluid, power and data communication.

A packer 18 is positioned on the drill pipe 14 and can be actuated to seal the borehole around the drill pipe 14 at the region of interest. Various pieces of downhole equipment 20 for testing and the like are connected to the drill pipe 14, either above or below the packer 18, such as a sampler 22, or a tester valve 24. The downhole equipment 20 may also be referred to herein as a "downhole tool." Other Examples of downhole equipment 20 can include:

Further packers
Circulation valves
Downhole chokes
Firing heads
TCP (tubing conveyed perforator) gun drop subs
Pressure gauges
Downhole flow meters
Downhole fluid analysers
Etc.

As shown in FIG. 1, the sampler 22 and the tester valve 24 are located above the packer 18. In order to support signal transmission along the drill pipe 14 between the downhole location and the surface, a series of wireless modems $25M_{i-2}$, $25M_{i-1}$, 25M, $25M_{i+1}$, etc. may be positioned along the drill pipe 14 and mounted to the drill pipe 14 via any suitable technology, such as gauge carriers 28a, 28b, 28c, 28d, etc. to form a telemetry system 26. The downhole equipment 20 is shown to be connected to the wireless modem $25M_{i+1}$ positioned between the sampler 22 and tester valve 24. The wireless modems $25M_{i-2}$, $25M_{i-1}$, 25M, $25M_{i+1}$ can be of various types and communicate with each other via at least one communication channel 29 using one or more various protocols. For example, the wireless modems $25M_{i-2}$, $25M_{i-1}$, 25M, $25M_{i+1}$ can be acoustic modems, i.e., electro-mechanical devices adapted to convert one type of energy or physical attribute to another, and may also transmit and receive, thereby allowing electrical signals received from downhole equipment 20 to be converted into acoustic signals for transmission to the surface, or for transmission to other locations of the drill pipe 14. In this example, the communication channel 29 is formed by the elastic media 13 and/or the drill pipe 14 although it should be understood that the communication channel 29 can take other forms. In addition, the wireless modem $25M_{i+1}$ may operate to convert acoustic tool control signals from the surface into electrical signals for operating the downhole equipment 20. The term "data," as used herein, is meant to encompass control signals, tool status, and any variation thereof whether transmitted via digital or analog signals. It should be noted that in lieu of the drill pipe 14, other appropriate tubular member(s) (e.g., elastic media 13) may be used as the communication channel 29, such as production tubing, and/or casing to convey the acoustic signals.

Figure 2:
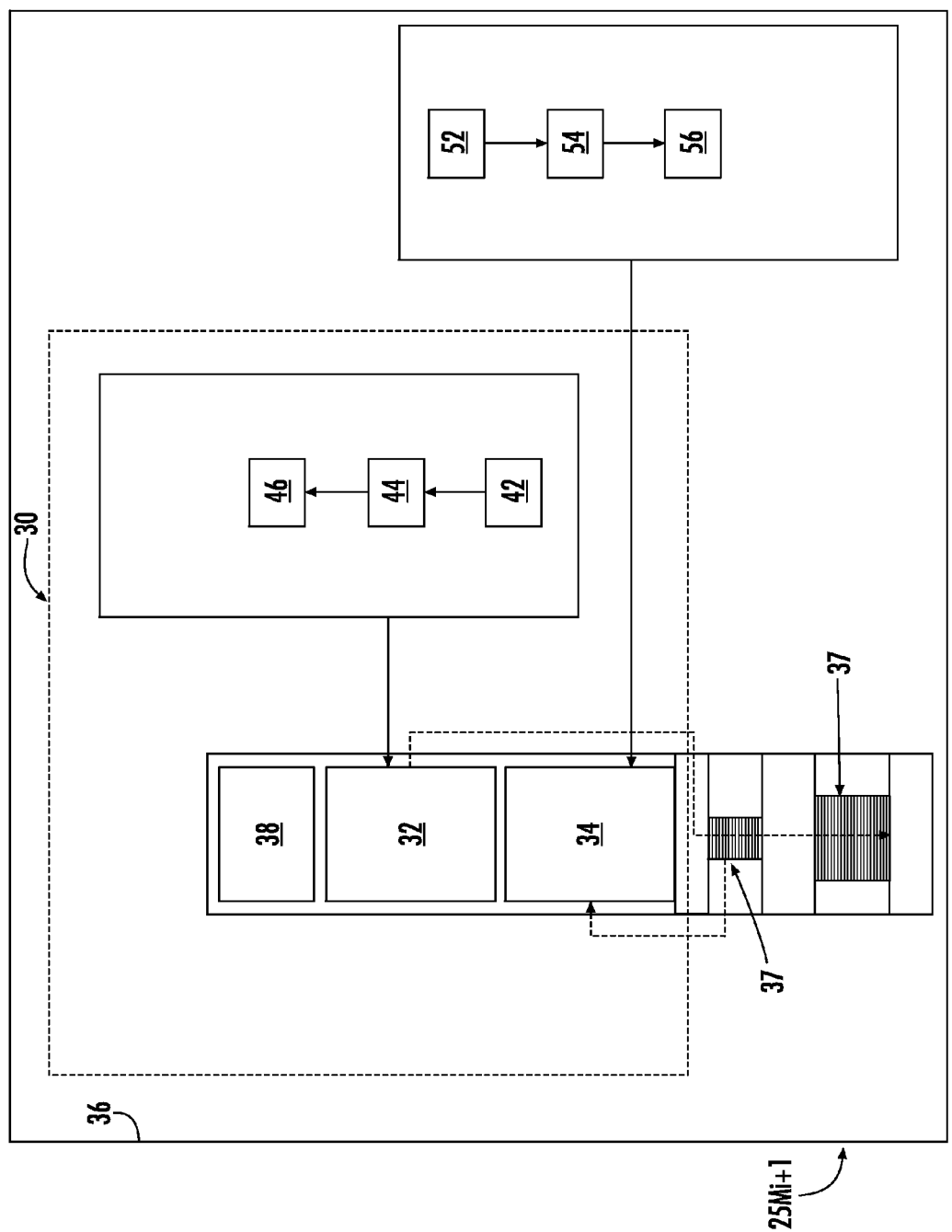
FIG. 2 is a partial block diagram of an exemplary wireless modem constructed in accordance with the present invention.

Referring to FIG. 2, the wireless modems $25M_{i-2}$, $25M_{i-1}$, 25M, $25M_{i+1}$ include transceiver electronics 30 including transmitter electronics 32 and receiver electronics 34. The wireless modems $25M_{i-2}$, $25M_{i-1}$, 25M, and $25M_{i+1}$ also include one or more wireless transceiver assembly 37 (two being shown by way of example). The transmitter electronics 32 and receiver electronics 34 may also be located in a housing 36 and power is provided by means of one or more battery, such as a lithium battery 38. Other types of one or more power supply may also be used. The wireless modems $25M_{i-2}$, $25M_{i-1}$, 25M, $25M_{i+1}$ are of similar construction and function except as discussed below. For purposes of brevity, the construction of one of the wireless modems 25 $M_{i+1}$ will be discussed below.

The transmitter electronics 32 are arranged to initially receive an electrical output signal from a sensor 42, for example from the downhole equipment 20 provided from an electrical or electro/mechanical interface. Such signals are typically digital signals which can be provided to one or more processing unit 44 which modulates the signal in one of a number of known ways such as FM, PSK, QPSK, QAM, and the like. The resulting modulated signal is amplified by either a linear or non-linear amplifier 46 and transmitted to the one or more wireless transceiver assembly 37 so as to generate a wireless, e.g., acoustic, signal in the material of the drill pipe 14. The wireless transceiver assembly 37 will be described herein by way of example as an acoustic type of transceiver assembly that converts electrical signals to acoustic signals and vice-versa. However, it should be understood that the wireless transceiver assembly 37 can be embodied in other forms including an electromagnetic transceiver assembly, or a pressure-type transceiver assembly using technologies such as mud-pulse telemetry, pressure-pulse telemetry or the like.

The acoustic signal that passes along the drill pipe 14 as a longitudinal and/or flexural wave comprises a carrier signal which optionally includes an applied modulation of the data received from the sensors 42. The acoustic signal typically has, but is not limited to, a frequency in the range 1-10 kHz, preferably in the range 2-5 kHz, and is configured to pass data at a rate of, but is not limited to, about 1 bps to about 200 bps, preferably from about 5 to about 100 bps, and more preferably about 50 bps. The data rate is dependent upon conditions such as the noise level, carrier frequency, and the distance between the wireless modems $25M_{i-2}$, $25M_{i-1}$, 25M, $25M_{i+1}$. A preferred embodiment of the present invention is directed to a combination of a short hop acoustic telemetry system for transmitting data between a hub located above the main packer 18 and a plurality of downhole equipment such as valves below and/or above said packer 18. The wireless modems $25M_{i-2}$, $25M_{i-1}$, 25M, $25M_{i+1}$ can be configured as repeaters. Then the data and/or control signals can be transmitted from the hub to a surface module either via a plurality of repeaters as acoustic signals or by converting into electromagnetic signals and transmitting straight to the top. The combination of a short hop acoustic with a plurality of repeaters and/or the use of the electromagnetic waves allows an improved data rate over existing systems. The telemetry system 26 may be designed to transmit data as high as 200 bps. Other advantages of the present system exist.

The receiver electronics 34 are arranged to receive the acoustic signal passing along the drill pipe 14 produced by the transmitter electronics 32 of another modem. The receiver electronics 34 are capable of converting the acoustic signal into an electric signal. In a preferred embodiment, the acoustic signal passing along the drill pipe 14 excites the transceiver assembly 37 so as to generate an electric output signal (voltage); however, it is contemplated that the acoustic signal may excite an accelerometer 50 or an additional transceiver assembly 37 so as to generate an electric output signal (voltage). This signal is essentially an analog signal carrying digital information. The analog signal is applied to a signal conditioner 52, which operates to filter/condition the analog signal to be digitalized by an A/D (analog-to-digital) converter 54. The A/D converter 54 provides a digitalized signal which can be applied to a processing unit 56. The processing unit 56 is preferably adapted to demodulate the digital signal in order to recover the data provided by the sensor 42 connected to another modem, or provided by the surface. The type of signal processing depends on the applied modulation (i.e. FM, PSK, QPSK, QAM, and the like).

The wireless modem $25M_{i+1}$ can therefore operate to transmit acoustic data signals from the one or more sensor 42 in the downhole equipment 20 along the drill pipe 14. In this case, the electrical signals from the downhole equipment 20 are applied to the transmitter electronics 32 (described above) which operate to generate the acoustic signal. The wireless modem $25M_{i+1}$ can also operate to receive acoustic control signals to be applied to the downhole equipment 20. In this case, the acoustic signals are demodulated by the receiver electronics 34 (described above), which operate to generate the electric control signal that can be applied to the downhole equipment 20.

In order to support acoustic signal transmission along the drill pipe 14 one or more of the wireless modems $25M_{i-2}$, $25M_{i-1}$, 25M, $25M_{i+1}$ may be configured as a repeater and positioned along the drill pipe 14. In the example described herein, the wireless modems $25M_{i-2}$, $25M_{i-1}$, and 25M are configured as repeaters and can operate to receive an acoustic signal generated in the drill pipe 14 by a preceding wireless modem 25 and to amplify and retransmit the signal for further propagation along the drill pipe 14. The number and spacing of the repeater modems $25M_{i-2}$, $25M_{i-1}$, and 25M, will depend on the particular installation selected, for example or the distance that the signal must travel. A typical spacing between the modems $25M_{i-2}$, $25M_{i-1}$, 25M, $25M_{i+1}$ is around 1,000 ft, but may be much more or much less in order to accommodate all possible testing tool configurations. When acting as a repeater, the acoustic signal is received and processed by the receiver electronics 34 and the output signal is provided to the processing unit 56 of the transmitter electronics 32 and used to drive the transceiver assembly 37 in the manner described above. Thus an acoustic signal can be passed between the surface and the downhole location in a series of short hops.

The role of a repeater modem, for example, $25M_{i-2}$, $25M_{i-1}$, and 25M, is to detect an incoming signal, to decode it, to interpret it and to subsequently rebroadcast it if required. In some implementations, the wireless modems $25M_{i-2}$, $25M_{i-1}$, and 25M, do not decode the signal but merely amplify the signal (and the noise). In this case the wireless modems $25M_{i-2}$, $25M_{i-1}$, and 25M are acting as a simple signal booster. However, this is not the preferred implementation selected for wireless telemetry systems of the present invention.

Wireless modems $25M_{i-2}$, $25M_{i-1}$, and 25M are positioned along the tubing/piping string 14. The wireless modems $25M_{i-2}$, $25M_{i-1}$, 25M, $25M_{i+1}$ will either listen continuously for any incoming signal or may listen from time to time.

The acoustic wireless signals, conveying commands or messages, propagate in the transmission medium (the drill pipe 14) in an omni-directional fashion, that is to say up and down. It is not necessary for the wireless modem $25M_{i+1}$ to know whether the acoustic signal is coming from another wireless modem $25M_{i-2}$, $25M_{i-1}$, and/or 25M, above or below. The direction of the message is preferably embedded in the message itself. Each message contains several network addresses: the address of the transmitter electronics 32 (last and/or first transmitter) and the address of the destination modem, for example, the wireless modem $25M_{i+1}$. Based on the addresses embedded in the messages, the wireless modems $25M_{i-2}$, $25M_{i-1}$, and 25M configured as repeaters will interpret the message and construct a new message with updated information regarding the transmitter electronics 32 and destination addresses. Messages being sent from the surface will usually be transmitted from the wireless modem $25M_{i-2}$ to the wireless modem $25M_{i-1}$ to the wireless modem 25M, to the wireless modem $25M_{i+1}$ and slightly modified along the way to include new network addresses.

Referring again to FIG. 1, the wireless modem $25M_{i-2}$ is provided as part of the well head equipment 16 which provides a connection between the drill pipe 14 and a data cable or wireless connection 62 to a control system 64 that can receive data from the downhole equipment 20 and provide control signals for its operation.

In the embodiment of FIG. 1, the telemetry system 26 is used to provide communication between the surface and the downhole location. In another embodiment, acoustic telemetry can be used for communication between tools in multizone testing. In this case, two or more zones of the well are isolated by means of one or more packers 18. Test downhole equipment 20 is located in each isolated zone and corresponding modems, such as the wireless modem $25M_{i+1}$ are provided in each zone case. Operation of the wireless modems $25M_{i-2}$, $25M_{i-1}$, 25M, and $25M_{i+1}$ allows the downhole equipment 20 in each zone to communicate with each other as well as the downhole equipment 20 in other zones as well as allowing communication from the surface with control and data signals in the manner described above.

References in the specification to "one embodiment", "an embodiment", "an example embodiment", etc. indicate that the embodiments described may include a particular feature, structure or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such future, structure, or characteristic in connection with other embodiments whether or not explicitly described.

Embodiments of the invention with respect to the processing units 44 and 56, and the control system 64 may be embodied utilizing machine executable instructions provided or stored on one or more machine readable medium. A machine-readable medium includes any mechanism which provides, that is, stores and/or transmits, information accessible by the processing units 44 and 56 or another machine, such as the control system 64. The processing units 44 and 56 and the control system 64 include one or more computer, network device, manufacturing tool, or the like or any device with a set of one or more processors, etc., or multiple devices having one or more processors that work together, etc. In an exemplary embodiment, a machine-readable medium includes volatile and/or non-volatile media for example read-only memory, random access memory, magnetic disk storage media, optical storage media, flash memory devices or the like. In one embodiment, the processing units 44 and 56 can be implemented as a single processor, such as a micro-controller, digital signal processor, central processing unit or the like.

Such machine executable instructions are utilized to cause a general or special purpose processor, multiple processors, or the like to perform methods or processes of the embodiments of the invention.

Wireless modems 25 can be programmed with a network discovery algorithm and/or a path optimization algorithm stored by one or more machine readable medium that when executed by the processing units 44 and/or 56 cause one of the wireless modems 25 to discover the identity, position, and/or relative order of other wireless modems 25 which are capable of communicating with each other via the communication channel 29 with the network discovery algorithm, and/or to select particular wireless modems 25 to communicate with using the path optimization algorithm. The network discovery algorithm and/or the path optimization algorithm can be stored as one or more files, one or more sections of instructions, in one or more database as separate or same records, or in any other suitable manner accessible by the processing unit(s) 44 and/or 56.

Network Discovery Algorithm

In general, the processing unit 44 and/or the processing unit 56 of the wireless modems 25 execute instructions of the network discovery algorithm to (1) enable the transmitter electronics 32 to transmit an identification signal into the communication channel 29, (2) receive data from at least one other wireless modem 25 by the receiver electronics 34 indicative of (a) a unique identifier identifying at least one other wireless modem 25, and (b) at least one local sensor measurement related to the depth or altitude of the at least one other wireless modem 25 relative to the surface of the earth, and (3) determine the position, and/or relative order of at least one or more other wireless modem 25 using the data indicative of the local sensor measurement. More particularly, FIGS. 3a, 3b, 4a, and 4b illustrate two different versions of the network discovery algorithm for permitting certain ones of the modems 25 to discover the identity, position, and/or relative order of the modems 25 within the network of the telemetry system 26.

The data indicative of at least one local sensor measurement can be provided in a variety of manners, such as information of the local sensor measurement, e.g., 50 degrees centigrade, information used to look up the local sensor measurement from a table or database, or the manner in which the wireless modems 25 communicate, such as a particular protocol or frequency or use of a particular time slot as discussed below with respect to FIGS. 4a and 4b.

Figure 3A:
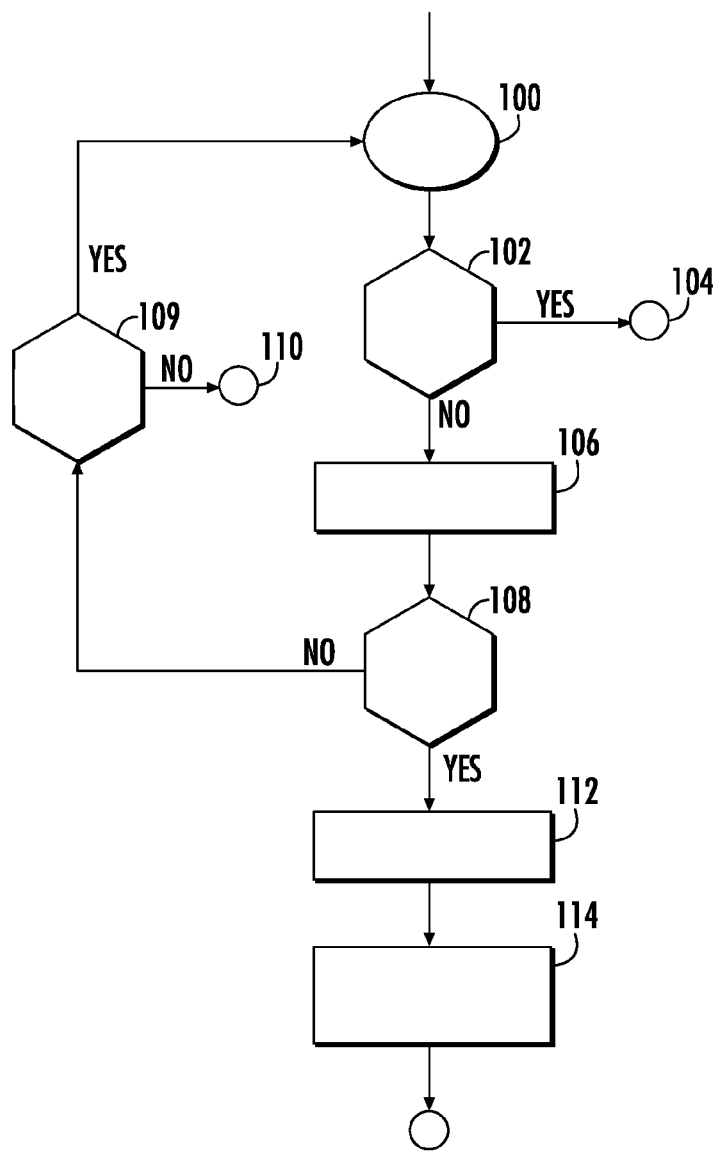
FIGS. 3a and 3b are logic flow diagrams of a method for discovering a network of wireless modems in a downhole environment in accordance with one aspect of the present invention.
Figure 3B:
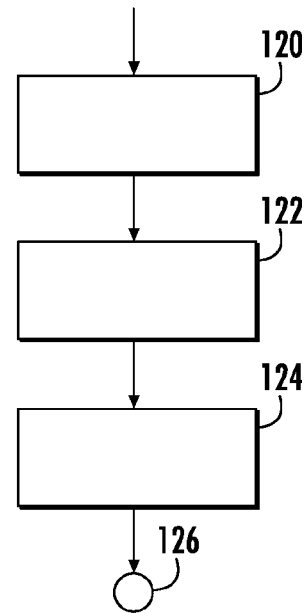

Referring now to FIGS. 3a and 3b, such Figures cooperate to illustrate the logic of a version of the network discovery algorithm operating within a wireless modem 25. FIG. 3a illustrates a portion of the network discovery algorithm trying to discover the identity (e.g., a network or IP address), position (e.g., 1000 feet below the surface of the Earth), and/or relative order (e.g., 2000 feet below the wireless modem 25 transmitting the identification signal) of the other modems 25. FIG. 3b illustrates a portion of the network discovery algorithm where one of the other modems 25 is responding to a request (discussed herein as an identification signal) from the other modem 25.

As shown in FIG. 3a, the network discovery algorithm begins as indicated by a block 100, and branches to a block 102 where the network discovery algorithm determines whether this particular modem 25 knows information such as identity, position, and/or relative order of the other modems 25 within the network. The other modems 25 within the network can be referred to as "neighbors". If the wireless modem 25 already knows the identity, position, and/or relative order of the other modems 25, then the network discovery algorithm branches to a block 104 thereby either ending the network discovery algorithm or branching to the portion of the network discovery algorithm depicted in FIG. 3b that is monitoring the receiver electronics 34. If not, the network discovery algorithm branches to a block 106 wherein the network discovery algorithm causes the processing unit 44 and/or 56 to transmit the identification signal into the communication channel 29. The identification signal includes at least a network address or other type of identification information identifying the particular modem 25 transmitting the identification signal so that other modems 25 can reply to the correct modem 25. The identification signal can include further information such as one or more local sensor measurement provided by or sensed by the sensor 42, for example. Once the identification signal has been transmitted into the communication channel 29, the network discovery algorithm branches to a step 108 where the network discovery algorithm monitors the receiver electronics 34 to determine whether any answers have been received from other wireless modems 25 within the network. If no answers have been received (or all of the answers have been received), then the network discovery algorithm branches to a step 109 where the network discovery algorithm determines whether to try to locate any further information with respect to the other modems 25. If the network discovery algorithm determines to send another identification signal then the network discovery algorithm branches to the block 100, and if not the network discovery algorithm branches to a block 110 thereby either ending the network discovery algorithm or branching to the portion of the network discovery algorithm depicted in FIG. 3b that is monitoring the receiver electronics 34. The network discovery algorithm can determine whether to continue requesting further information from the other modems 25 using any suitable manner, such as a fixed number of requests, dynamic number of requests, or the like.

If the network discovery algorithm determines that any answers have been received in the step 108, then such network discovery algorithm branches to a step 112 where the network discovery algorithm compares its own local sensor measurement with data indicative of a measurement received from another one of the wireless modems 25, and then the network discovery algorithm branches to a step 114 where it determines the identification, position and/or relative order of the wireless modems 25 that have answered. The network discovery algorithm can determine the identification, position, and/or relative order in any suitable manner, however, it is specifically contemplated that the local sensor measurements taken by the particular wireless modems 25 are correlated to the depth of the particular wireless modems 25. This correlation will be described in more detail below.

When a particular wireless modem 25 broadcasts the identification signal as discussed above in step 106, such identification signal can be received and decoded by the other wireless modems 25 within the network. As shown in FIG. 3b, the network discovery algorithm executed by the wireless modems 25 causes the wireless modems 25 to monitor the receiver electronics 34 and wait to receive an identification signal from another one of the wireless modems 25, as indicated by step 120. Once the network discovery algorithm receives the identification signal utilizing the receiver electronics 34, the network discovery algorithm branches to a step 122 where the network discovery algorithm enables the processing unit 44 and/or 56 to create an answer that includes its local sensor measurement related to its depth within the well bore or altitude above the well-bore. The network discovery algorithm then branches to a step 124 where the network discovery algorithm causes the processing unit 44 and/or 56 to enable the transmitter electronics 32 to transmit the answer, preferably in a random timeslot.

The particular wireless modem 25 that transmitted the identification signal in the step 106, then receives the answer and processes such answer as discussed above with respect to steps 108, 112, and 114 to determine information regarding its neighbors. After the wireless modem 25 transmits its answer in a random timeslot, for example, as indicated by the step 124, such network discovery algorithm branches to a step 126 where the network discovery algorithm waits to receive a further identification message.

Figures 4A, 4B:
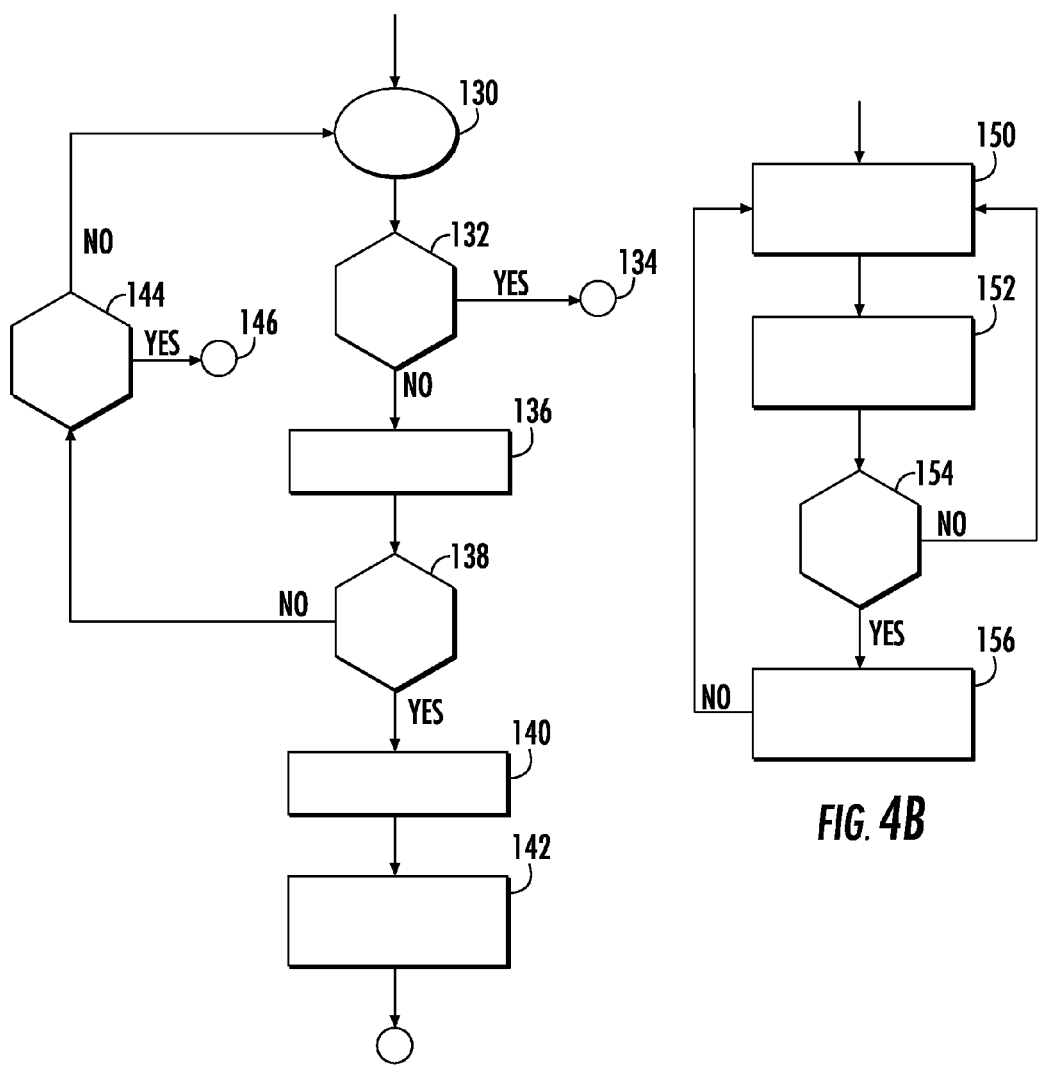
FIGS. 4a and 4b are logic flow diagrams of an alternative method for discovering a network of wireless modems in a downhole environment in accordance with another aspect of the present invention.

Referring to FIGS. 4a and 4b, shown therein is another version of the network discovery algorithm in which FIG. 4a shows the network discovery algorithm from the standpoint of the wireless modem 25 who is trying to discover the identity, position and/or relative order of the other wireless modems 25 within the network, while FIG. 4b illustrates the network discovery algorithm from the standpoint of the other wireless modems 25 that are being discovered.

As shown in FIG. 4a, the network discovery algorithm starts as indicated by a step 130, and then branches to a step 132 which is similar to the step 102 discussed above, where the particular wireless modem 25 determines whether it knows the identity, position, and/or relative order of the other wireless modems 25 within the network. If so, then the network discovery algorithm branches to a step 134, and if not, the network discovery algorithm branches to the step 136 where such network discovery algorithm enables the transmitter electronics 32 to transmit the identification signal into the communication channel 29 with the identification signal including an identification, such as network address, of the wireless modem 25, and the wireless modem's 25 local sensor measurement derived by utilizing the sensor 42, for example. The network discovery algorithm branches to a step 138 which is similar to the step 108 discussed above. In the step 138, the network discovery algorithm monitors the receiver electronics 34 to see if any answer(s) have been received, and if so, the network discovery algorithm branches to a step 140 to determine which time slot the answer was transmitted within. The network discovery algorithm then branches to a step 142 and determines the position, and/or relative order of the wireless modem 25 based upon the timeslot, for example, in which the answer was received. If no other answers were received at step 138, the network discovery algorithm branches to a step 144 to see if it should broadcast its identification signal again and if so branches to the block 130, and if not branches to the block 146.

Referring now to FIG. 4b, shown therein is a portion of the network discovery algorithm which can be executed by the processing unit 44 and/or 56 of the wireless modems 25 and functions to provide answers to the identification signal broadcasted by the particular wireless modem 25 trying to discover the identity, position and/or relative order of the other wireless modems 25 within the network. As shown in FIG. 4b, the network discovery algorithm branches to a step 150 where the receiver electronics 34 waits to receive an identification signal containing a local sensor measurement of another wireless modem 25. If so, the network discovery algorithm branches to a step 152 and compares its own local sensor measurement with the local sensor measurement that was received. Once the comparison is completed, the network discovery algorithm branches to a step 154 where it determines whether to create an answer using any suitable logic, such as the distance from the wireless modem 25 transmitting the identification message. For example, the wireless modems 25 could be programmed to only wait two timeslots (due to total time limitations). In this case, if a particular wireless modem 25 was more than two hops away from the wireless modem 25 transmitting the identification signal, then the particular wireless modem 25 would not create an answer. If the network discovery algorithm decides or determines to create an answer, the network discovery algorithm branches to a step 156 where it enables the transmitter electronics 32 to answer using data indicative of the local sensor measurement. For example, the answer can be transmitted in a precise timeslot according to the measurement comparison, or using another type of predefined communication scheme, such as a particular predetermined protocol or frequency. Thereafter, the network discovery algorithm branches to the step 150 to wait to receive another identification signal.

Figure 5A:
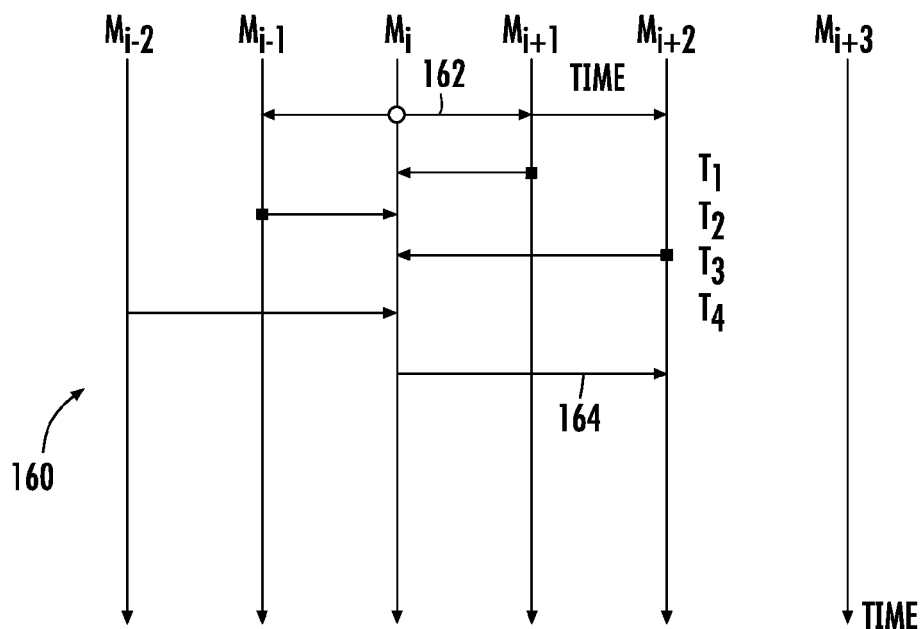
FIGS. 5a and 5b are timing diagrams of versions of the interaction of several wireless modems in accordance with the methods depicted in FIGS. 4a and 4b.

FIG. 5a is a timing diagram 160 of a version of the network discovery algorithm illustrated in FIGS. 4a and 4b. In particular, FIG. 5a depicts the timing of the interaction of five wireless modems 25 communicating on the communication channel 29. In the example depicted in FIG. 5, the wireless modem 25M (shown as $M_i$) transmits the identification signal as shown by reference numeral 162 and described in step 136 of FIG. 4a. The identification signal is received by the wireless modems $25M_{i-2}$, $25M_{i-1}$, $25M_{i+1}$ and $25M_{i+2}$. As shown in FIG. 5, the wireless modems $25M_{i-2}$, $25M_{i-1}$, $25M_{i+1}$ and $25M_{i+2}$ receive the identification signal, compare the local sensor measurement within the identification signal with their own local sensor measurement and reply to the identification signal based upon predetermined time slots, for example. In the example depicted in FIG. 5, the wireless modems $25M_{i+1}$ and $25M_{i+2}$ which have a depth greater than the wireless modem 25M reply on odd number time slots $T_1$ and $T_3$ based upon their relative position with respect to the wireless modem 25M. Similarly, the wireless modems $25M_{i-2}$, $25M_{i-1}$ which have a depth less than the depth of the wireless modem 25M respond on even time slots $T_2$ and $T_4$ based upon their relative position with respect to the wireless modem 25M. The wireless modem $25M_{i+1}$ responds in a first timeslot $T_1$, the wireless modem $25M_{i-1}$ responds in a second timeslot $T_2$, the wireless modem $25M_{i+2}$ responds in a third timeslot $T_3$, and the wireless modem $25M_{i-2}$ responds in a fourth timeslot $T_4$. The wireless modem 25M receives and stores the answers including the identification information of the other wireless modems $25M_{i-2}$, $25M_{i-1}$, $25M_{i+1}$ and $25M_{i+2}$ within the network along with their position and/or relative order, and then transmits directly to the wireless modem $25M_{i+2}$ (as indicated by reference numeral 164) utilizing the identification information received in the answer from the wireless modem $25M_{i+2}$.

In this example, the wireless modems $25M_{i-2}$, $25M_{i-1}$, 25M, $25M_{i+1}$ and $25M_{i+2}$ can be placed along the drill pipe 14 separated with a 1000 m spacing. The local sensor measurement can be temperature or pressure since it is known that the relation between depth and pressure, for example, is:

$$P_i = \rho_{mud} \cdot g \cdot d_i \quad (1)$$

where $\rho_{into}$ is the density of the mud in the annular, g is the gravity acceleration and $d_i$ is the distance measured from the surface. It can be assumed that the temperature at the surface is 25° C. and the gradient of the temperature in the pipe is 25° C./Km For example, assuming $\rho_{mud} = 1.5 \cdot \rho_{Water}$ and $g = 10$ $ms^{-2}$:

| Depth (m) | Pressure (Pa) | Pressure(bar) | Temperature(C.) |
|---|---|---|---|
| 1000 | $1.5 \cdot 10^7$ | 150 | 50 |
| 2000 | $3 \cdot 10^7$ | 300 | 75 |
| 3000 | $4.5 \cdot 10^7$ | 450 | 100 |
| 4000 | $6 \cdot 10^7$ | 600 | 125 |
| 5000 | $7.5 \cdot 10^7$ | 750 | 150 |

If each wireless modem 25 interchanges its local sensor measurement with its neighbors, the other modems 25 position, and/or relative order of the wireless modems 25 can be determined using a correlation similar to the one shown above. The term local sensor measurement, as used herein, refers to a measurement of an environmental condition associated with a particular wireless modem 25 that is sufficiently precise to distinguish the particular wireless modem's measurement from the measurements of the other wireless modems 25. The sensor 42 can be part of the downhole equipment 20 or part of the wireless modem 25. The local sensor measurements can be taken in a borehole or any other suitable locations associated with the wireless modems 25. Examples of local sensor measurements include a temperature measurement, a pressure measurement, a gravitational acceleration measurement, a magnetic field measurement, a dip angle measurement and combinations thereof.

Figure 5B:
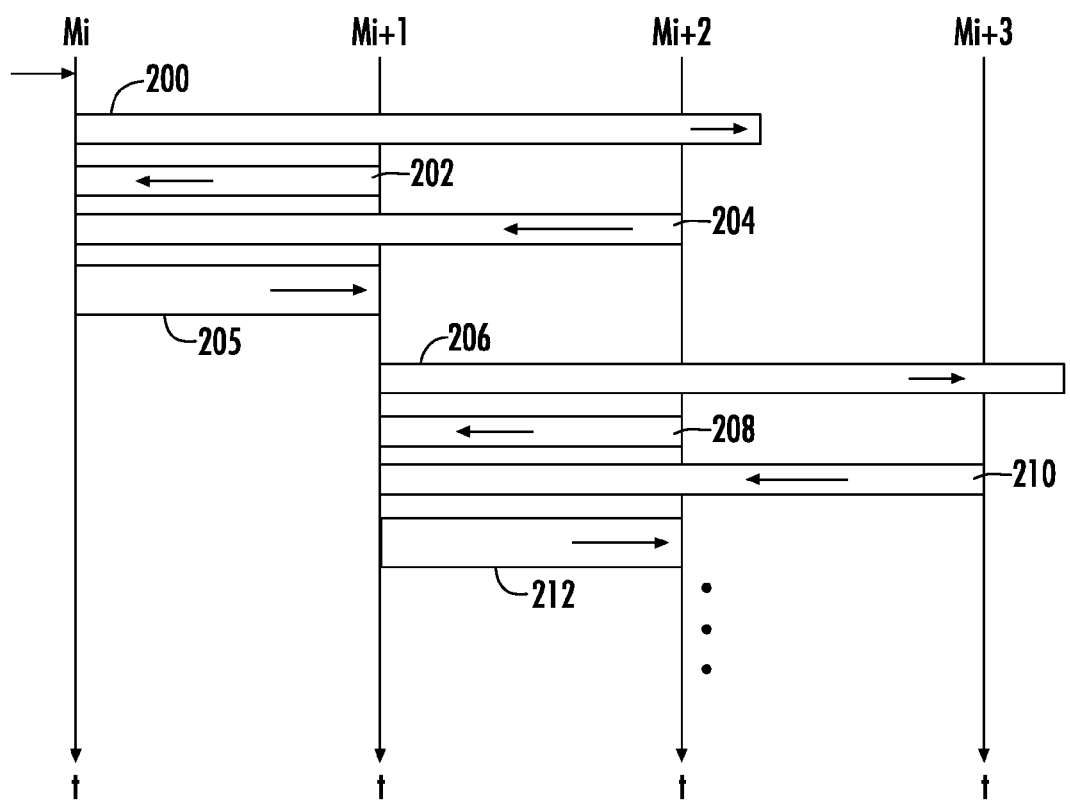

Referring now to FIG. 5b, shown therein is an alternative version of the interaction of several wireless modems $25M_i$, $25M_{i+1}$, $25M_{i+2}$, $25M_{i+3}$ in accordance with the methods depicted in FIGS. 4a and 4b. In this version, at the step 154 (depicted in FIG. 4b) the wireless modems 25 determine whether to create an answer as follows. In the step 152, the wireless modems 25 which receive an identification signal and compare their own local sensor measurement with the local sensor measurement in the identification signal. Then, in the step 154, the wireless modems 25 create an answer if (1) such wireless modems 25 are at a depth deeper than the wireless modem that transmitted the identification signal, and (2) are within two hops of the wireless modem 25 that transmitted the identification signal. Thus, as shown in FIG. 5b, the wireless modem 25 $M_i$, broadcasts an identification signal including its local sensor measurement as indicated by step 200, and wireless modems $25M_{i+1}$, and $25M_{i+2}$ create answer as indicated by steps 202 and 204 while wireless modem $25M_{i+3}$ does not. Discovery is continued as indicated by step 205 by the next deeper wireless modem $25M_{i+1}$, transmitting an identification signal as indicated by step 206 and wireless modems $25M_{i+2}$ and $25M_{i+3}$ creating an answer as indicated by steps 208 and 210. This process repeats as indicated by step 212 until the deepest wireless modem $25M_{i+3}$ transmits an identification signal, but an answer is not received. At this point, all of the wireless modems 25 know the identification, position and/or order of at two or more of the wireless modems 25 to communicate with.

Path Optimization Algorithm

Turning now to a different aspect of the present disclosure, disclosed is a path optimization algorithm (or method) and a wireless modem adapted to implement said algorithm. Once the wireless modems 25 in a downhole environment have been discovered, for example using the above described methods, or other network discovery methods known in the art, the present disclosure relates to a path optimization algorithm, and wireless modems adapted to implement said algorithm, wherein a communication path to communicate from the surface to downhole is determined based upon one or more predetermined criterion such as transmission speed, latency reduction, time consumption, processing speed or the like. In particular, disclosed are variations of the path optimization algorithm that are discussed below under the following notations: a full optimization algorithm, a fast optimization algorithm, and a fast-full optimization algorithm.

Once a drill pipe 14, having the wireless modems 25 adapted to communicate in the communication channel 29 and knowing each other's relative position (by being preprogrammed with the relative positions of the wireless modems 25, or discovering same using the network discovery algorithm discussed above), has been placed downhole in the well 10, it is desirous to determine the optimal communication path between the surface and downhole via the wireless modems 25. In one aspect, the path optimization algorithm determines the optimal communication path in order to reduce the latency of the telemetry system 26. The latency generally refers to the time needed to make a request downhole and receive the answer at the surface, or vice versa. As is understood, it is desirous to keep the latency of the telemetry system 26 as small or short as possible.

Path optimization criterion include, but are not limited to, the communication speed and also the number of communication hops between the surface and downhole. The communication speed is typically measured in bits per second (bps) and it is generally desired to communicate between the surface and downhole as fast as possible. Another criterion is the number of hops between the surface and downhole, i.e., the number of wireless modems 25 that have to communicate with each other in order to pass information from the surface to a downhole tool, and vice versa. It is usually preferred to minimize the number of hops between the surface and downhole in order to reduce the latency and thereby increase the communication speed. For example, it is desired to skip or jump as many wireless modems 25 as possible between the surface and downhole. In certain circumstances, it can be desirous for wireless modem $25M_i$ to communicate directly with wireless modem $25M_{i+2}$ rather than communicating with wireless modem $25M_{i+1}$.

As is understood in the art and discussed above, a wide variety of criteria can influence the communication channel 29. The presently disclosed path optimization algorithm generally tests the communication capabilities between at least wireless modems 25 one and two hops away in order to determine the optimal communication path between the modems, however, wireless modems 25 that are more than two hops away can also be tested and selected in accordance with the present disclosure Turning again to FIG. 2, shown therein is a wireless modem adapted to implement the path optimization algorithm in accordance with the present invention. As discussed above, the wireless modems 25 ($25M_{i+1}$ being shown in FIG. 2) includes transceiver electronics 30 including transmitter electronics 32 and receiver electronics 34. The wireless modems 25 also include one or more wireless transceiver assembly 37 (two being shown by way of example). The transmitter electronics 32 and receiver electronics 34 may also be located in a housing 36 and power is provided by means of one or more battery, such as a lithium battery 38. Other types of one or more power supply may also be used. The wireless modems $25M_{i-2}$, $25M_{i-1}$, 25M, $25M_{i+1}$ can be of similar construction and function. Generally, the transceiver electronics 30, including the transmitter electronics 32 and receiver electronics 34, operate as described above. In accordance with another aspect of the present invention, the transceiver electronics 30, including the transmitter electronics 32 and receiver electronics 34 are adapted to vary the parameters of the wireless signals sent into the communication channel 29. For instance, the transceiver electronics 30 can vary the frequency, bit rate, timing, amplitude, and the like, of the wireless signal being sent into the communication channel 29. Two or more variable parameters of the wireless signals generally define the transmission pair for the wireless signals.

As also discussed above, the transmitter electronics 32 and the receiver electronics 34 includes processing units 44 and 56, respectively. Embodiments with respect to the processing units 44 and 56 may utilize machine executable instructions provided or stored on one or more non-transitory machine readable medium (which is referred to herein as a "machine-readable medium"). A machine-readable medium includes any mechanism which provides, that is, stores and/or transmits, information accessible by the processing units 44 and 56 or another machine, such as the control system 64. The processing units 44 and 56 and the control system 64 include one or more computer, network device, manufacturing tool, or the like or any device with a set of one or more processors, etc., or multiple devices having one or more processors that work together, etc. In an exemplary embodiment, a machine-readable medium includes volatile and/or non-volatile media for example read-only memory, random access memory, magnetic disk storage media, optical storage media, flash memory devices or the like.

In one embodiment, the processing units 44 and 56 can be implemented as a single processor, such as a micro-controller, digital signal processor, central processing unit or the like.

Wireless modems 25 can be programmed with the path optimization algorithm stored by one or more machine readable medium that when executed by the processing units 44 and/or 56 cause one of the wireless modems 25 to determine a communication path, such as an optimal path, for communication between the wireless modems 25 via the communication channel 29. The path optimization algorithm can be stored as one or more files, one or more sections of instructions, in one or more database as separate or same records, or in any other suitable manner accessible by the processing unit(s) 44 and/or 56.

In general, the processing unit 44 and/or the processing unit 56 of the wireless modems 25 execute instructions of the path optimization algorithm to (1) enable the transmitter electronics 32 to transmit the wireless signals into the communication channel 29 to at least two modems 25 in a first direction (e.g., up or down) away from the transceiver assembly 37, (2) receive a signal from at least one of the modems 25, (3) assign a quality parameter to the signals received from the other wireless modems 25, and (4) select one of the modems 25 to communicate with based on the quality parameter. More particularly, FIGS. 6-10 illustrate three different versions of the path optimization algorithm for permitting certain ones of the modems 25 to determine a communication path of the modems 25 within the network of the telemetry system 26.

As will be discussed below, the processing units 44 and 56 of the wireless modems 25 preferably execute instructions of the path optimization algorithm to vary the signal parameters of the wireless signal being sent into the communication channel 29. In one example, the processing units 44 and 56 of the wireless modems 25 execute instructions which varies the signal frequency, the signal bit rate, the signal timing, the signal strength, and the like, of the wireless signal being transmitted into the communication channel 29.

The plurality of wireless modems 25 can include a unique identification number identifying each of, or at least a portion of the wireless modems 25 forming the telemetry system 26. Also, the wireless modem 25 can be programmed or otherwise knows its own position on the drill pipe 14 and also the relative position of the other wireless modems 25. That is, wireless modem $25M_i$ knows that it is positioned between modem $25M_{i+1}$ and $25M_{i-1}$, i.e., that said modems are 'one-hop' from modem $25M_i$. Further, wireless modem $25M_i$ also knows that modem $25M_{i+2}$ is positioned two hops away in a first direction, for example.

Additionally, the wireless modems 25 are programmed or otherwise know a common set of communication parameters for the wireless signals communicated between the other wireless modems 25. For example, the wireless modems 25 of the telemetry system 26 can each include hardware, logic and/or instructions identifying a common set of transmission and reception characteristics for the wireless signals. The term "transmission characteristic" or "transmission characteristics," as used herein generally refers to a signal parameter, or combination of signal parameters forming the wireless signals being transmitted and received between the wireless modems 25. In the examples described herein two transmission characteristics are varied, and such are referred to herein as a transmission pair. In one instance, a transmission pair can refer to the wireless signal having a first frequency and a first bit rate. Together, the first frequency and the first bit rate define a first transmission pair for the wireless signal. In another instance, the wireless modem 25 can change the wireless signal to a second frequency and/or a second bit rate to thereby define a second transmission pair for the wireless signal.

By way of example, in one embodiment, the wireless modem 25 is adapted to have six transmission pairs wherein the path optimization algorithm can include logic and/or instructions to cause the transmitter electronics 32 to transmit wireless signals into the communication channel 29 on each of the six transmission pairs formed by combinations of three different frequencies (a first frequency, a second frequency, and a third frequency) and two different bit rates (a first bit rate and a second bit rate). In one embodiment, the first, second and third frequencies are combined with the first bit rate to define a first, a second, and a third transmission pair. The first, second and third frequencies can then be combined with the second bit rate to thereby define a fourth, a fifth, and a sixth transmission pair. In one aspect, the first bit rate can be higher than the second bit rate. Although in the above example six transmission pairs are provided, it is to be understood that a wide variety of signal parameter(s) can be changed and combined to define a different number of transmission characteristics for the wireless signal.

Figure 6:
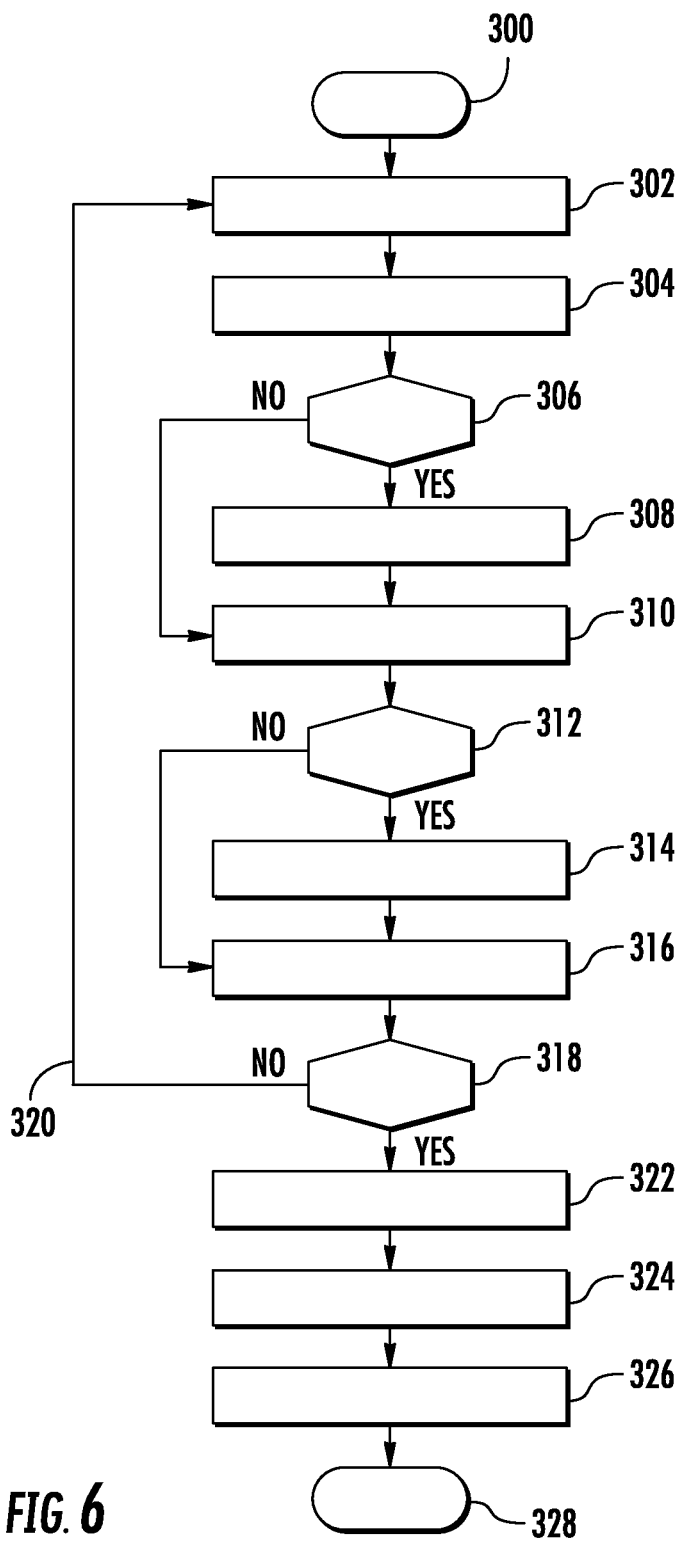
FIG. 6 is a logic flow diagram of a method for determining a communication path for wireless modems communicating in a downhole environment in accordance with one aspect of the present invention.

Turning now to FIG. 6, shown therein is a logic flow diagram of a first version of the path optimization algorithm (also referred to as the full optimization algorithm version) in accordance with the present invention. The following description of the path optimization algorithm is discussed from the perspective of the wireless modem $25M_i$, and it's communication with modems $25M_{i+1}$ and $25M_{i+2}$. Generally though, the path optimization algorithm is executed with the interaction of a first modem, a second modem and a third modem. The second modem, e.g., the modem $25M_{i+1}$ is preferably one hop away in a first direction. The third modem, e.g., the modem $25M_{i+2}$ is preferably two hops away in the first direction. The second modem can be referred to herein as a "one hop modem" and the third modem can be referred to herein as a two hop modem. Once the first modem has completed the path optimization algorithm, a token is passed to the second modem so that it can then execute the path optimization algorithm. This process repeats itself until each, or at least a portion of the modems 25 forming the telemetry system 26 have determined the best path to communicate between itself and the two nearest other modems.

The process generally begins at step 300. In step 300, the initialization parameters are determined by the modems 25 forming the telemetry system 26. For instance, the wireless modems 25 learn or otherwise are programmed with (1) their own identification number, (2) their relative location on the drill pipe 14 and the relative position of other wireless modems 25, and (3) the wireless signal parameters, e.g., first, second, and third frequencies (f1, f2, and f3) and first and second bit rates ($br_{high}$ and $br_{low}$) to thereby define the transmission pairs. As discussed above, the combination of the frequency parameter and the bit rate parameter define the transmission pair for the wireless signals. Further, the wireless modem $25M_i$ is provided with the network path optimization token which generally identifies the modem $25M_i$ as the testing modem.

At step 302, the wireless modem $25M_i$ broadcasts a wireless signal having a first transmission pair (e.g., frequency $f_1$ and bit rate $br_{high}$) downhole, i.e., towards wireless modems $25M_{i+1}$ and $25M_{i+2}$. Wireless modem $25M_i$ then listens for a response from modem $25M_{i+1}$ at step 304. That is, if wireless modem $25M_{i+1}$ receives the broadcast from modem $25M_i$, wireless modem $25M_{i+1}$ responds by transmitting a wireless signal on the same transmission pair to the modem $25M_i$. If modem $25M_{i+1}$ did not receive the broadcast from modem $25M_i$, wireless modem $25M_i$ could not then respond with a transmission to modem $25M_i$. This is shown at step 306 wherein, if the wireless modem $25M_i$ receives a response from modem $25M_{i+1}$, the wireless modem $25M_i$ proceeds to step 308 wherein the response is stored. In one aspect, at step 308, modem $25M_i$ stores the response received from $25M_{i+1}$, by assigning a quality parameter to the received signal and storing the quality parameter. More particularly, in one aspect, wireless modem $25M_i$ "receives" a response from modem $25M_{i+1}$ (or from modem $25M_{i+2}$) when a quality parameter of the response signal is higher than a predetermined value or threshold. Examples of deterministic factors of the received signal used to determine the quality parameter include, but are not limited to a Signal-to-Noise Ratio (SNR), a Signal-to-Interference-Noise Ratio (SINR), Intersymbol Interference measure, the distortion level (which may be measured as "channel response time"), combinations thereof, and the like, of the response signal.

If no response is received from modem $25M_{i+1}$, modem $25M_i$ skips to step 310 wherein modem $25M_i$ listens for a response from modem $25M_{i+2}$. In one aspect, modem $25M_i$ listens for a response at step 304 on a first timeslot (or first window) and then listens for a response at step 310 on a second time slot (or second window). Utilization of predetermined time slots (or windows) for modems $25M_{i+1}$ and $25M_{i+2}$ to respond to the broadcast signal from modem $25M_i$ helps prevent conflicting responses at modem $25M_i$, for example.

If wireless modem $25M_{i+2}$ receives the broadcast from modem $25M_i$, it responds by transmitting a wireless signal having the same transmission pair to modem $25M_i$. If modem $25M_{i+2}$ did not receive the broadcast from modem $25M_i$, it could not then respond with a transmission to modem $25M_i$. This is shown at step 312 wherein, if the wireless modem $25M_i$ receives a response from modem $25M_{i+2}$ on the first transmission pair, it proceeds to step 314 wherein the response is stored. Like the process described above, modem $25M_i$ stores the response received from $25M_{i+2}$ by assigning a quality parameter to the received signal, i.e., wireless modem $25M_i$ "receives" a response from modem $25M_{i+2}$ when a quality parameter of the response signal is higher than a predetermined value or threshold.

If no response is received from modem $25M_{i+2}$, modem $25M_i$ skips to step 316 wherein modem $25M_i$ determines if each of the transmission pairs have been tested. If each of the transmission pairs have not been tested between the modem $25M_i$ and the modems $25M_{i+1}$ and $25M_{i+2}$, the modem $25M_i$ changes the parameter of the wireless signal to thereby define a second transmission pair and then broadcasts the wireless signal having the second transmission pair, such as shown at step 302. More particularly, in the full path optimization algorithm, the modem $25M_i$ broadcasts the wireless signal for each of the transmission pairs stored therein and subsequently stores the quality parameter for each response received, if any. For example, the modem $25M_i$ first broadcasts the signal at step 302 having the first transmission pair (e.g., $f_1$ and $br_{high}$). Then, once any responses from modems $25M_{i+1}$ and $25M_{i+2}$ have been received and stored, the modem $25M_i$ changes to the second transmission pair (e.g., $f_2$ and $br_{high}$) and then rebroadcasts the wireless signal having the second transmission pair to the modems $25M_{i+1}$ and $25M_{i+2}$. This process is repeated until each transmission pair is tested, and the responses stored. This is shown in FIG. 6 at step 318, wherein, if each transmission pair has not been tested, the modem $25M_i$ changes at least one of the parameters of the wireless signals to thereby define the second transmission pair, and then returns to step 302 (see line 320) to repeat the process for the second transmission pair.

Referring to FIG. 7, shown therein is one example of a table storing the answers received by modem $25M_i$ from the modems $25M_{i+1}$ and $25M_{i+2}$. As can be seen, the path optimization algorithm stored on the modem $25M_i$ stores the response received from each of the modems $25M_{i+1}$ and $25M_{i+2}$ for each of the transmission pairs stored thereon and tested. The example table shown in FIG. 7 reveals that for at least a portion of the transmission pairs tested, the modem $25M_i$ did not receive any response from the other modems, or at least no response meeting the predetermined quality parameter, and therefore did not assign a quality parameter to that modem at that transmission pair. As the table also shows, the quality parameter is assigned and stored for each received signal, wherein the quality parameter is indicative of the ability of the wireless modem, at that transmission pair, to transmit and/or receive information to and from the modem $25M_i$ to the other modems.

Returning to FIG. 6 now, if each of the transmission pairs have been tested between modem $25M_i$ and the modems $25M_{i+1}$ and $25M_{i+2}$, the process proceeds to step 322 wherein the modem $25M_i$ compares the quality parameter of the answer received from each modem for each transmission pair (e.g., the table shown in FIG. 7) with at least one predetermined criterion to determine the best transmission pair to assign as the primary communication between the modem $25M_i$ and the modems $25M_{i+1}$ and $25M_{i+2}$. It is to be understood that a variety of criterion can be considered to determine the at least one predetermined criterion for an optimal communication path between the modem $25M_i$ and the modem $25M_{i+1}$ and also between the modem $25M_i$ and the modem $25M_{i+2}$. For example, the determination can be based on criteria, such as the bit rate of the transmission pair and the relative locations of the modem $25M_i$ and the modems $25M_{i+1}$ and $25M_{i+2}$ to enhance the bit rate while reducing latency. The determination preferably gives a higher priority to transmission pairs that can be used to skip a modem 25 so as to reduce latency. Other criterion, such as time consumption of transmission, energy consumption or processing consumption can also be used to determine the communication path.

At step 324, wireless modem $25M_i$ transmits a confirmation message to the modem $25M_{i+1}$ on the optimal transmission pair determined for that modem, and also a confirmation message to the modem $25M_{i+2}$ on the optimal transmission pair assigned to that modem, to thereby set those transmission pairs as the optimal communication protocol between said modems. In the example shown in FIG. 7, the modem $25M_i$ can determine that the optimal communication transmission pair between the modem $25M_i$ and modem $25M_{i+1}$ can be transmission pair 3 (for example because the transmission pair 4 has a lower bit rate and pair 1 has a lower quality parameter) and that the optimal transmission pair between the modem $25M_i$ and modem $25M_{i+2}$ can be transmission pair 3. In this example, the modem $25M_i$ sends the confirmation signal to modem $25M_{i+1}$ on transmission pair 3 and another confirmation signal to modem $25M_{i+2}$ on transmission pair 3.

At this point in the process, the modem $25M_i$ has enough information to determine the optimal communication path between itself and the modems $25M_{i+1}$ and $25M_{i+2}$. That is, the modem $25M_i$ can determine that the optimal communication path is between itself and the modem $25M_{i+2}$, to reduce latency by skipping the modem $25M_{i+1}$ and communicating directly with modem $25M_{i+2}$. The modem $25M_i$ also has stored enough information to determine which transmission pair to communicate on.

Once the confirmation messages are sent at step 324, the process moves to step 326 wherein the modem $25M_i$ sends the token to the modem $25M_{i+1}$ which then sets modem $25M_{i+1}$ as the path optimization determination modem. That is, the process discussed above and shown in FIG. 6 is repeated from the perspective of the modem $25M_{i+1}$ to thereby determine the optimal communication path and optimal transmission pair between it and the modems $25M_{i+2}$ and $25M_{i+3}$. This process preferably continues until each of the modems 25 forming the telemetry system 26 has established the optimal communication transmission pair between itself and the next two modems. Once each modem of the telemetry system 26 determines the optimal communication path and transmission pair, the last modem transmits a finish message back to the surface which indicates all the optimal transmission pairs between the modems have been determined. This is shown in FIG. 6 at step 328, wherein the process ends once each of the transmission pairs has been tested for each of the modems 25 and the resulting information is provided to the surface.

Turning now to FIG. 8, shown therein is a table showing one example of a resulting trace-route table generated using the above-described process. The trace-route table lists the optimal transmission pair between each wireless modem 25 and its nearest two other wireless modems 25 in the first direction, e.g., the trace-route table lists the frequency and bit rate used to communicate between the modem 25 and its nearest two other modems 25, even though the modems 25 have selected one of the two other modems 25 to usually communicate with in an effort to optimize the communication path as discussed above. This information is saved in the event that a particular modem 25 needs to communicate with the neighboring modem 25 that has not been selected. For example, the modem $25M_i$ stores information related to $25M_{i+1}$ even if the modem $25M_i$ is going to communicate directly with the modem $25M_{i+2}$ because the modem $25M_{i+2}$ may have failed and it may be necessary for the modem $25M_i$ to communicate directly with the modem $25M_{i+1}$.

Figure 9:
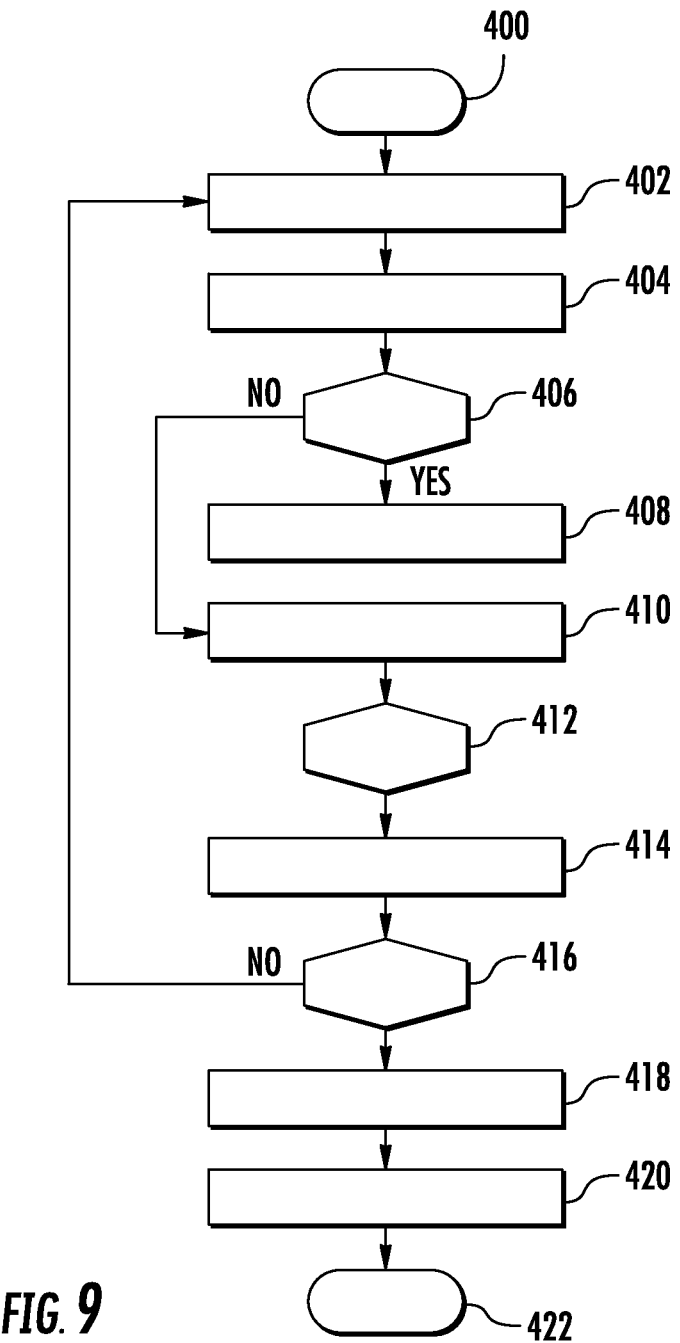
FIG. 9 is a logic flow diagram of an alternative method for determining a communication path for wireless modems communicating in a downhole environment in accordance with another aspect of the present invention.

Turning now to a different aspect of the path optimization algorithm, shown in FIG. 9 is a flow chart illustrating a fast path optimization algorithm in accordance with the present invention. The fast optimization algorithm is similar to the full optimization algorithm discussed above, except that not all of the transmission pairs are tested. Instead, the first modem $25M_i$ tests a first transmission pair and then, if a response is received from the modems $25M_{i+1}$ and $25M_{i+2}$, the modem $25M_i$ stores the quality parameter for each communication path, selects the optimal communication path based on the stored quality parameter, and then passes the token to the modem $25M_{i+1}$ to continues the process. Generally, in the fast algorithm, the same process is repeated only until a response is received and stored from the other modems that meets the predetermined value. Once an acceptable quality parameter is stored for each modem, the process passes the token to the next modem to repeat the process. The fast path optimization algorithm is generally quicker to execute, thereby permitting utilization of the telemetry system 26 faster, but also may not test and identify the most optimal communication path to be used, i.e., only a transmission pair meeting the predetermined criteria is used.

Referring now to FIG. 9, the fast path optimization algorithm starts at step 400, which is similar to step 300 described above. In this step, the initialization information is stored in the modem $25M_i$. At step 402, the modem $25M_i$ broadcasts the wireless message on the first transmission pair downhole towards the modems $25M_{i+1}$ and $25M_{i+2}$, i.e., in the first direction. At step 404, the modem $25M_i$ listens for a response on the first transmission pair from the modem $25M_{i+1}$. Similar to above, the modem $25M_i$ can listen for the response at a first time window. At step 406, the modem $25M_i$ determines if a response was received from the modem $25M_{i+1}$. If a response is received, the quality parameter is stored for that transmission pair at step 408. If no response is received from the modem $25M_{i+1}$, the process moves to step 410 wherein the modem $25M_i$ listens for a response from modem $25M_{i+2}$. Again, the modem $25M_i$ can listen for the response at a second time window. At step 412, the modem 25M$_i$ determines if a response was received from the modem 25M$_{i+2}$. If a response was received, the quality parameter for that modem on that transmission pair is stored at step 414. At step 416, the modem 25M$_i$ determines if an acceptable quality parameter has been stored for the modem 25M$_{i+1}$ and if a quality parameter has been stored for the modem 25M$_{i+2}$. If not, the modem 25M$_i$ changes the signal parameter to move to the second transmission pair and returns to the step 402 to repeat the process on the second transmission pair. In this example, as shown in FIG. 7, signals having acceptable quality parameters were received from both modems 25M$_{i+1}$ and 25M$_{i+2}$ with the first transmission pair. In this event, at step 416, the modem 25M selects the modem 25M$_{i+2}$ to communicate with on the first transmission pair.

If an acceptable quality parameter has been stored for each of the modems 25M$_{i+1}$ and 25M$_{i+2}$ on at least one transmission pair, the process moves to step 418 wherein the modem 25M$_i$. sends the confirmation messages to the modems 25M$_{i+1}$ and 25M$_{i+2}$, on the saved transmission pair, to thereby set the communication parameter between said modems. That is, in the fast path optimization algorithm, the process repeats itself until at least one quality parameter is stored for the communication path between the modem 25M$_i$ and the modem 25M$_{i+1}$ and also a quality parameter is stored for the communication path between the modem 25M$_i$ and the modem 25M$_{i+2}$. At step 420, the modem 25M$_i$ sends the token to the modem 25M$_{i+1}$ to change the path optimization determining modem. Similar to the process discussed above, the fast path optimization algorithm continues for each modem 25 forming the telemetry system 26 until each modem has determined at least one quality parameter between itself and its nearest two other modems. This is shown in FIG. 9 at step 422 wherein the process ends and the last modem 25 transmits the finish message to the surface, as described above.

Turning now to yet another version of the path optimization algorithm, disclosed is a fast-full path optimization algorithm. The fast-full optimization algorithm combines features of the full algorithm and the fast algorithm. Generally, once the modem 25M$_i$ has received a response and stored a quality parameter for each of the modems 25M$_{i+1}$ and 25M$_{i+2}$ on a transmission pair having a high bit rate, the remaining transmission pairs are not tested and the token is passed. The fast-full path optimization algorithm is generally more reliable than the fast optimization algorithm but takes more time to execute, and is also not as reliable as the full path optimization algorithm but takes less time to execute.

Figure 10:
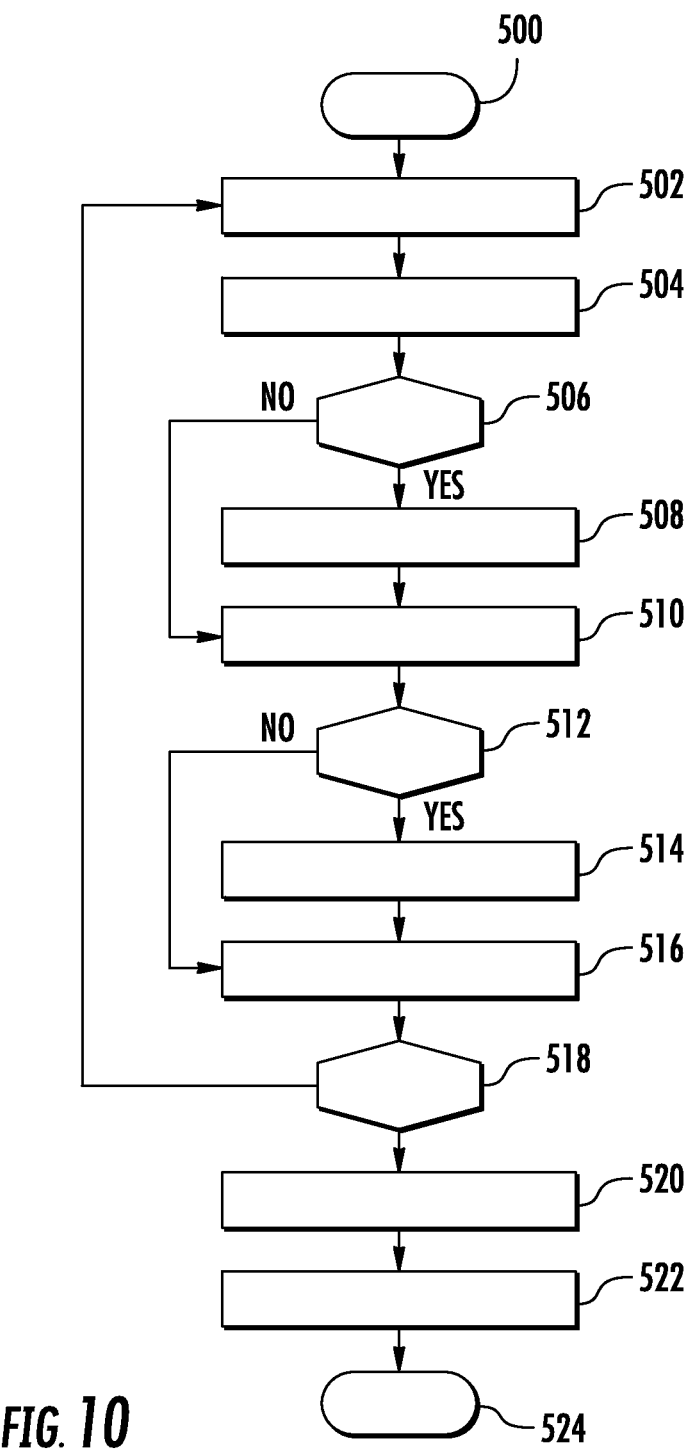
FIG. 10 is a logic flow diagram of another alternative method for determining a communication path for wireless modems communicating in a downhole environment in accordance with another aspect of the present invention.

Referring now to FIG. 10, the fast path optimization algorithm starts at step 500, which is similar to steps 300 and 400 described above. In this step, the initialization information is stored in the modem 25M$_i$. At step 502, the modem 25M$_i$ broadcasts the wireless message on the first transmission pair downhole towards the modems 25M$_{i+1}$ and 25M$_{i+2}$, i.e., in a first direction. In the fast-full path optimization algorithm, the first transmission pair includes a fast bit rate. At step 504, the modem 25M$_i$ listens for a response on the first transmission pair from the modem 25M$_{i+1}$. Similar to above, the modem 25M$_i$ can listen for the response at a first time window. At step 506, the modem 25M$_i$ determines if a response was received from the modem 25M$_{i+1}$. If a response is received, the quality parameter is stored for that transmission pair at step 508. If no response is received from the modem 25M$_{i+1}$, the process moves to step 510 wherein the modem 25M$_i$ listens for a response from modem 25M$_{i+2}$. Again, the modem 25M$_i$ can listen for the response at a second time window. At step 512, the modem 25M$_i$ determines if a response was received from the modem 25M$_{i+2}$. If a response was received, the quality parameter for that modem on that transmission pair is stored at step 514. At step 516, the modem 25M$_i$ determines if a quality parameter has been stored for the modem 25M$_{i+1}$ on a transmission pair having a high bit rate and if a quality parameter has been stored for the modem 25M$_{i+2}$ on a transmission pair having a high bit rate. If not, the modem 25M$_i$ changes the signal parameter to move to the second transmission pair, also having a high bit rate and returns to the step 502 to repeat the process on the second transmission pair (see step 518).

If a quality parameter has been stored for each of the modems 25M$_{i+1}$ and 25M$_{i+2}$ on at least one transmission pair having a high bit rate, the process moves to step 520 wherein the modem 25M$_i$. sends the confirmation messages to the modems 25M$_{i+1}$ and 25M$_{i+2}$, on the saved transmission pair, to thereby set the communication parameter between said modems. That is, in the fast-full path optimization algorithm, the process repeats itself until at least one quality parameter is stored on a transmission pair having a high bit rate for the communication path between the modem 25M$_i$ and the modem 25M$_{i+1}$ and also a quality parameter on a transmission pair having a high bit rate is stored for the communication path between the modem 25M$_i$ and the modem 25M$_{i+2}$. At step 522, the modem 25M$_i$ sends the token to the modem 25M$_{i+1}$ to thereby change the path optimization determining modem. Similar to the process discussed above, the fast-full path optimization algorithm continues for each modem 25 forming the telemetry system 26 until each modem has determined at least one quality parameter on a transmission pair having a high bit rate between itself and its nearest two other modems 25. This is shown in FIG. 10 at step 524 wherein the process ends and the last modem 25 transmits the finish message to the surface, as described above.

In accordance with another aspect of the present disclosure, the above described modems 25 and algorithms can be implemented in a telemetry system 26 utilizing acoustic signals to communicate in the communication channel 29.

It should be understood that the components of the inventions set forth above can be provided as unitary elements, or multiple elements which are connected and/or otherwise adapted to function together, unless specifically limited to a unitary structure in the claims.

From the above description it is clear that the present invention is well adapted to carry out the disclosed aspects, and to attain the advantages mentioned herein as well as those inherent in the invention. While presently preferred implementations of the invention have been described for purposes of disclosure, it will be understood that numerous changes may be made which readily suggest themselves to those skilled in the art and which are accomplished within the spirit of the invention disclosed.

The invention claimed is:

1. A wireless modem for communication in a network of wireless modems via a communication channel, the wireless modem comprising:
   a transceiver assembly;
   transceiver electronics, comprising:
      transmitter electronics to cause the transceiver assembly to send wireless signals into the communication channel;
      receiver electronics to decode signals received by the transceiver assembly;

at least one processing unit executing instructions to (1) enable the transmitter electronics to transmit the wireless signals into the communication channel to at least two wireless modems in a first direction away from the transceiver assembly, wherein one of the two wireless modems is communicatively coupled intermediate the transceiver assembly and the other of the two wireless modems, (2) determine a characteristic of signals received at the transceiver electronics from the at least two wireless modems in response to the transmitted wireless signals, (3) assign a quality parameter to the signals received from the at least two wireless modems based on the determined characteristic, and (4) determine whether the intermediate wireless modem can be skipped based on a comparison of the quality parameters assigned to the received signals with at least one predetermined criterion and select one of the at least two wireless modems to directly communicate with based on the result of the determination; and a power supply supplying power to the transceiver assembly and the transceiver electronics.

2. The wireless modem of claim 1, wherein the wireless signals sent into the communication channel comprise a variable signal frequency and a variable signal bitrate cooperating to define a transmission pair for the wireless signals.

3. The wireless modem of claim 1, wherein the at least one processing unit executing instructions to further (5) enable the transmitter and receiver electronics to subsequently communicate with the selected wireless modem.

4. The wireless modem of claim 3, wherein the selected wireless modem is characterized as at least a two hop modem, such that the selected wireless modem has at least one other modem in between the wireless modem and the selected wireless modem.

5. The wireless modem of claim 4, wherein the at least one processing unit enables the transmitter electronics and the receiver electronics to communicate with the selected wireless modem by using a selected transmission pair based on the quality parameter assigned to the signal received from the selected wireless modem.

6. The wireless modem of claim 1, wherein one of the wireless modems is a first wireless modem, and another one of the wireless modems is a second wireless modem, and wherein the at least one processing unit executes instructions to enable the receiver electronics to receive the signal from first wireless modem on a first predetermined time slot and to receive the signal from the second wireless modem on a second predetermined time slot such that the signals are received at different times.

7. The wireless modem of claim 1, wherein one of the wireless modems is a first wireless modem, and another one of the wireless modems is a second wireless modem, and wherein the at least one processing unit executes instructions to enable the receiver electronics to receive the signals from the first and second wireless modems on variable time slots.

8. The wireless modem of claim 1, wherein the determined characteristic of the signals received at the transceiver electronics is a signal-to-noise ratio, a signal-to interference-noise ratio, an intersymbol interference measure, or a distortion level.

9. An acoustic modem for communication in a network of acoustic modems via a tubing string positionable in a wellbore, the acoustic modem comprising:

a transceiver assembly;
transceiver electronics, comprising:
transmitter electronics to cause the transceiver assembly to send acoustic signals which define one or more transmission pairs into the tubing string, wherein each transmission pair has different transmission characteristics comprising a combination of a signal frequency and a signal bitrate;
receiver electronics to decode signals received by the transceiver assembly;
at least one processing unit executing instructions to (1) enable the transmitter electronics to transmit the acoustic signals into the tubing string to at least two acoustic modems in a first direction away from the transceiver assembly, wherein one of the two acoustic modems is communicatively coupled along the tubing string intermediate the transceiver assembly and the other of the two acoustic modems, (2) determine a characteristic of acoustic signals received at the transceiver electronics from the at least two acoustic modems in response to the transmitted acoustic signals, (3) assign a quality parameter to the acoustic signals received from the at least two acoustic modems based on the determined characteristic, and (4) determine whether the intermediate acoustic modem can be skipped based on a comparison of the quality parameters assigned to the received signals with at least one predetermined criterion and select one of the at least two acoustic modems to directly communicate with based on the determination; and a power supply supplying power to the transceiver assembly and the transceiver electronics.

10. The acoustic modem of claim 9, wherein the acoustic signals sent into the communication channel comprise a variable signal frequency and a variable signal bitrate cooperating to define a transmission pair for the acoustic signals.

11. The acoustic modem of claim 9, wherein the selected acoustic modem is at least a two hop acoustic modem, such that the selected acoustic modem has at least one other modem in between the acoustic modem and the selected acoustic modem.

12. The acoustic modem of claim 11, wherein the at least one processing unit enables the transmitter electronics and the receiver electronics to communicate with the selected acoustic modem by using a selected transmission pair based on the quality parameter assigned to the acoustic signal received from the selected acoustic modem.

13. The acoustic modem of claim 9, wherein one of the acoustic modems is a first acoustic modem, and another one of the acoustic modems is a second acoustic modem, and wherein the at least one processing unit executes instructions to enable the receiver electronics to receive the acoustic signal from the first acoustic modem on a first predetermined time slot and to receive the acoustic signal from the second acoustic modem on a second predetermined time slot such that the acoustic signals are received at different times.

14. The acoustic modem of claim 9, wherein one of the acoustic modems is a first acoustic modem, and another one of the acoustic modems is a second acoustic modem, and wherein the at least one processing unit executes instructions to enable the receiver electronics to receive the acoustic signals from the first and second acoustic modems on variable time slots.

15. The acoustic modem of claim 9, wherein the determined characteristic of the signals received at the transceiver electronics is a signal-to-noise ratio, a signal-to interference-noise ratio, an intersymbol interference measure, or a distortion level.

16. A method for determining a path to communicate using wireless modems in a downhole environment, comprising:
    coupling a plurality of wireless modems to an elongated member extending from within a borehole to a surface location so that the wireless modems are communicatively coupled in a series; and
    enabling a first wireless modem in the series to transmit a series of signals in a first direction from the first wireless modem via the elongated member, to receive a series of signals from other wireless modems, to determine a quality of the signals received from the other wireless modems in the series, to assign a quality parameter to the signals received from the other wireless modems based on the determined quality, to determine whether a communication path can be established via the elongated member that bypasses at least one of the wireless modems in the series based on a comparison of the quality parameters assigned to the received signals with at least one predetermined criterion, and to select which of the other wireless modems to communicate directly with based on the result of the determination.

17. The method of claim 16, wherein the determined quality of the signals received at the transceiver electronics is a signal-to-noise ratio, a signal-to interference-noise ratio, an intersymbol interference measure, or a distortion level.

18. The method of claim 16, further comprising enabling the first wireless modem to transmit a token to a second wireless modem in the series; and enabling the second wireless modem, responsive to receipt of the token, to (1) transmit a second wireless signal into the communication channel to at least two wireless modems in the first direction, (2) determine a characteristic of the signals received from the at least two wireless modems in response to the transmitted second wireless signal, (3) assign a quality parameter to the signals received from the at least two wireless modems based on the determined characteristic, (4) determine whether a signal path can be established that bypasses at least one of at least two modems based on a comparison of the quality parameters assigned to the received signals with at least one predetermined criterion, and (5) select one of the at least two wireless modems to communicate with based on the determination.

19. A method for making a wireless modem, comprising:
    connecting a transceiver assembly to transceiver electronics having transmitter electronics, receiver electronics, and at least one processing unit suitable for causing the transceiver assembly to transmit and receive wireless signals; and
    storing a signal path optimization process on one or more non-transitory machine readable media accessible by the at least one processing unit of the transceiver electronics with the signal path optimization process having instructions that when executed by the at least one processing unit cause the at least one processing unit to (1) enable the transmitter electronics to transmit a wireless signal into a communication channel to at least two modems in a first direction away from the transceiver assembly, (2) determine a characteristic of the signals received at the transceiver electronics from the at least two wireless modems in response to the transmitted wireless signal, (3) assign a quality parameter to the signals received from the at least two wireless modems based on the determined characteristic, (4) determine whether a signal path can be established that bypasses at least one of at least two modems that is communicatively coupled between the transceiver assembly and an other of the at least two wireless modems based on a comparison of the quality parameters assigned to the received signals with at least one predetermined criterion, and (5) select which of the at least two wireless modems to directly communicate with based on the determination of whether at least one of the at least two modems can be bypassed.

* * * * *